(12) United States Patent
Nomura et al.

(10) Patent No.: US 7,774,550 B2
(45) Date of Patent: Aug. 10, 2010

(54) STORAGE SYSTEM AND STORAGE SYSTEM CONTROL METHOD

(75) Inventors: Ken Nomura, Yokohama (JP); Hiroshi Mine, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/265,094

(22) Filed: Nov. 5, 2008

(65) Prior Publication Data

US 2009/0063778 A1 Mar. 5, 2009

Related U.S. Application Data

(63) Continuation of application No. 11/435,251, filed on May 12, 2006, now abandoned.

(30) Foreign Application Priority Data

Mar. 15, 2006 (JP) .............................. 2006-070224

(51) Int. Cl.
*G06F 12/08* (2006.01)
(52) U.S. Cl. ...................................... 711/137; 711/118
(58) Field of Classification Search ................. 711/137, 711/118
See application file for complete search history.

(56) References Cited

U.S. PATENT DOCUMENTS

| 5,452,440 | A * | 9/1995 | Salsburg ...................... 711/136 |
| 2005/0021501 | A1 | 1/2005 | Butron |
| 2005/0050279 | A1 * | 3/2005 | Chiu et al. .................. 711/137 |

FOREIGN PATENT DOCUMENTS

| EP | 1320037 | 6/2003 |
| JP | 02-018645 A | 1/1990 |
| JP | 06-119244 | 4/1994 |
| JP | 08-137754 | 5/1996 |
| JP | 2003-345519 | 12/2003 |

OTHER PUBLICATIONS

"Disk cache read prefetch command function for personal system," IBM Technical Disclosure Bulletin pp. 491-492, IBM Corp. (May 1991).

* cited by examiner

*Primary Examiner*—Sanjiv Shah
*Assistant Examiner*—Jae U Yu
(74) *Attorney, Agent, or Firm*—Townsend and Townsend and Crew LLP

(57) ABSTRACT

A storage system of the present invention improves the response performance of sequential access to data, the data arrangement of which is expected to be sequential. Data to be transmitted via streaming delivery is stored in a storage section. A host sends data read out from the storage section to respective user machines. A prefetch section reads out from the storage section ahead of time the data to be read out by the host, and stores it in a cache memory. A fragmentation detector detects the extent of fragmentation of the data arrangement in accordance with the cache hit rate. The greater the extent of the fragmentation, the smaller the prefetch quantity calculated by a prefetch quantity calculator. A prefetch operation controller halts a prefetch operation when the extent of data arrangement fragmentation is great, and restarts a prefetch operation when the extent of fragmentation decreases.

16 Claims, 14 Drawing Sheets

STORAGE SYSTEM AND STORAGE SYSTEM CONTROL METHOD

CROSS-REFERENCE TO RELATED APPLICATION(S)

This is a continuation of U.S. patent application Ser. No. 11/435,251, filed on May 12, 2006, which claims priority from Japanese Patent Application No. 2006-070224 filed on Mar. 15, 2006, the entire disclosure of which is incorporated herein by reference.

BACKGROUND OF THE INVENTION

1. Field of the Invention

The present invention relates to a storage system and a storage system control method.

2. Description of the Related Art

In recent years, for example, technology for delivering video, voice and other content data in the form of movies, plays, news stories, and educational programming directly to users via networks has begun to become popular. At this point, the methods for supplying content data to users can be broadly divided into downloading systems and streaming systems.

In the case of downloading systems, the entire content data is stored on a user's computer, after which it becomes possible to view this content data. Because of this, it takes time before the content can be played back, lowering usability. By contrast, in the case of a streaming system, a portion of the content data can be viewed as soon as a user's computer receives it.

Thus, today, the delivery of content data using the streaming system (hereinafter, streaming delivery) is coming into widespread use. In the meantime, since content data quality is also being improved from year to year, content data size and bit rates are on the rise. Consequently, there is a demand for streaming delivery to deliver large-size content data more smoothly.

However, content data that is delivered via streaming is managed by a storage system. In line with the demand for faster streaming delivery, faster response performance is being demanded of storage systems as well. Since streaming delivery must deliver content data in accordance with a predetermined bit rate, storage systems are being expected to offer not only enhanced data transfer performance (throughput), but also improved response performance (latency). Prior art for solving such requirements has been proposed (Japanese Laid-open Patent No. 2003-345519 and Japanese Laid-open Patent No. 8-137754).

The first prior art of Japanese Laid-open Patent No. 2003-345519 strives to improve the cache hit rate by actively implementing on a plurality of drives prefetch processing for a sequential read request in a disk array device of a constitution that utilizes striping.

However, this first prior art is premised on the fact that the data is arranged sequentially on a recording medium, and does not take into consideration cases in which the data is not sequentially arranged on a recording medium.

In general, every time a file system adds or deletes data, the data stored on a recording medium is fragmented. The more data fragmentation progresses, the more useless the pre-reading of data using prefetch becomes, and the more response performance is lowered. As the extent of the data fragmentation increases, prefetch response performance is reduced to below the response performance of when data is read out directly from the recording medium without performing a prefetch. Consequently, the first prior art only works when data is arranged sequentially on a recording medium beforehand, and this sequential arrangement is guaranteed not to break down. That is, the first prior art is only effective for extremely limited applications, and has low usability.

Further, in the second prior art of Japanese Laid-open Patent No. 8-137754, a determination is made as to whether or not a file I/O request from a host computer is a sequential access. When access is sequential, the prefetch quantity is calculated based on continuity of access, and prefetch is carried out.

However, the second prior art is premised on a single sequential access, and cannot support multiple sequential accesses, in which a plurality of sequential accesses is generated simultaneously. In particular, for example, in streaming delivery, content data is delivered to each of a plurality of users. Viewed from the storage system side, since highly multiplexed sequential accesses (a plurality of streams) as a whole cannot constitute a single sequential access, prefetch cannot be carried out in the second prior art. That is, the second prior art cannot demonstrate its effect unless the number of streams is limited to a single stream.

SUMMARY OF THE INVENTION

With the foregoing in mind, an object of the present invention is to provide a storage system and storage system control method that make it possible to improve the response performance of sequential access to data that is expected to be read out sequentially. A further object of the present invention is to provide a storage system and storage system control method that make it possible to prevent sequential access response performance from dropping below a predetermined value even when the continuity of the data arrangement has been lost, enabling improved usability. Other objects of the present invention should become clear from the disclosure of the embodiments, which will be explained hereinbelow.

To solve for the above-mentioned problems, a storage system according to the present invention comprises a storage apparatus comprising at least one or more rewritable storage devices for storing data that is expected to be read out sequentially; a cache memory for storing data to be read out from the storage apparatus; a prefetch part for causing data stored in the storage apparatus to be read out in advance and stored in cache memory prior to receiving a sequential read access from a host machine; a continuity determination part for determining the continuity of the arrangement of data stored in the storage apparatus; a prefetch quantity calculator for calculating a prefetch quantity based on the results of a determination by the continuity determination part and the conditions of a read access from a host machine; and a prefetch operation controller for setting the prefetch quantity calculated by the prefetch quantity calculator in the prefetch part, and controlling the operation of the prefetch part based on the determination results by the continuity determination part.

In the present invention, the continuity determination part digitizes and outputs the continuity of the arrangement of data stored in a storage part based on a read access cache hit rate.

In the present invention, the prefetch operation controller halts a prefetch operation by the prefetch part when the determination result by the continuity determination part is equal to or less than a predetermined value set in advance.

In the present invention, the prefetch operation controller operates a prefetch operation by the prefetch part when the determination result by the continuity determination part is equal to or greater than another predetermined value set in advance.

In the present invention, the prefetch operation controller halts a prefetch operation by the prefetch part when the determination result by the continuity determination part is equal to or less than a predetermined value set in advance, and restarts a prefetch operation when the determination result is equal to or greater than another predetermined value set in advance.

In the present invention, the continuity determination part digitizes and outputs the continuity of the arrangement of data stored in a storage part based on a read access cache hit rate, and when a prefetch operation is halted, by predicting the cache hit rate for the time period that the prefetch operation is halted, determines the continuity of the arrangement of the data during the prefetch operation halt period.

In the present invention, the prefetch quantity calculator calculates the prefetch quantity based on the maximum data quantity of a read request from a host machine within a single cycle of a prefetch operation by the prefetch part.

In the present invention, the prefetch quantity calculator calculates the prefetch quantity by setting the maximum data quantity of a read-out request from a host machine within a single cycle of a prefetch operation by the prefetch part as the maximum prefetch quantity, and multiplying the digitized determination result by the continuity determination part by this maximum prefetch quantity.

In the present invention, the prefetch operation controller outputs an alert when halting a prefetch operation by the prefetch part.

In the present invention, the prefetch operation controller outputs an alert when halting prefetch operation by the prefetch part, and starts up rearrangement processing for consecutively arranging the data stored in the storage apparatus.

In the present invention, the prefetch part, the continuity determination part, the prefetch quantity calculator, and the prefetch operation controller respectively operate for each of logical volumes provided in a storage device.

In the present invention, the prefetch operation controller comprises a first mode, which causes a prefetch operation to be carried out by setting a prefetch quantity calculated by the prefetch quantity calculator in the prefetch part, and a second mode, which causes a prefetch operation to be carried out on the basis of an initial value set beforehand.

In the present invention, the prefetch operation controller operates the prefetch part in the second mode until the prefetch quantity calculator and continuity determination part become operational, and performs transitions from the second mode to the first mode when the prefetch quantity calculator and continuity determination part become operational.

A control method for a storage system according to another aspect of the present invention is a control method for controlling a storage system, which sends data to a host machine in accordance with a sequential read access from the host machine, and executes a prefetch step, in which data stored in a storage apparatus is read out in advance and stored in cache memory prior to receiving a sequential read access from a host machine; a continuity determination step, in which the continuity of the arrangement of data stored in a storage apparatus is determined on the basis of the cache hit rate of read accesses from a host machine; a prefetch quantity calculation step, in which a prefetch quantity to be used in a prefetch operation is calculated based on the result of a determination by the continuity determination part, and a maximum data quantity requested in a read access within a prescribed cycle; and a prefetch operational control step, in which a prefetch operation is either carried out or halted on the basis of the determination results resulting from the continuity determination step.

A storage control device in accordance with yet another aspect of the present invention is a storage control device, which is respectively connected to a storage apparatus comprising at least one or more rewritable storage devices for storing data for a sequential read, and a host machine for issuing a sequential read access to this storage apparatus, and comprises a cache memory for storing data read out from the storage apparatus; a prefetch part for causing data stored in the storage apparatus to be read out in advance and stored in cache memory prior to receiving a sequential read access from a host machine; a continuity determination part for determining the continuity of the arrangement of data stored in the storage apparatus; a prefetch quantity calculator for calculating a prefetch quantity based on the results of a determination by the a continuity determination part and the condition of a read access from a host machine; and a prefetch operation controller for setting the prefetch quantity calculated by the prefetch quantity calculator in the prefetch part, and controlling the operation of the prefetch part based on the determination results by the continuity determination part.

There are cases in which at least one part of the respective means, parts, and steps of the present invention is executable by a computer program. And, this computer program can be distributed in a state wherein it is affixed to various types of recording media, or it can be sent via a communications media.

DESCRIPTION OF THE PREFERRED EMBODIMENTS

Figure 1:
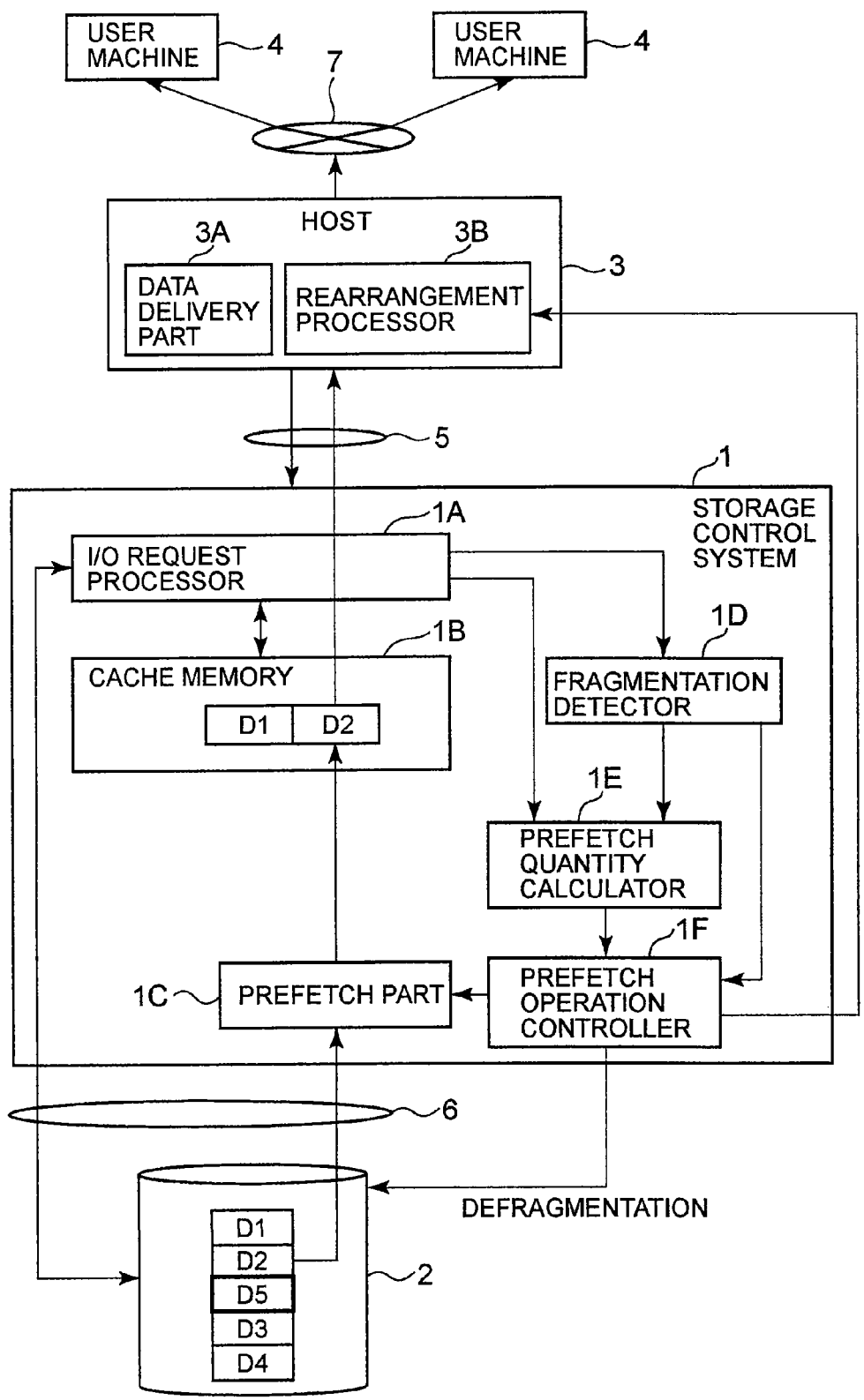
FIG. 1 is a schematic diagram showing the overall concept of an embodiment of the present invention.

An embodiment of the present invention will be explained hereinbelow by referring to the figures. FIG. 1 is a diagram schematically showing the overall concept of the present invention. This embodiment will be explained using a streaming delivery system as an example.

A storage system, for example, comprises a storage control device 1 and a storage part 2. The storage control device 1 is connected to a host computer, which serves as a "host machine" (hereinafter "host") 3 via a communication channel 5. Further, the storage control device 1 is connected to a storage part 2 via a communication channel 6. The storage control device 1 either reads data from the storage part 2, or writes data to the storage part 2 on the basis of an I/O request issued from the host 3.

The host 3, for example, carries out the streaming delivery of video, voice, and other such content data to user machines 4. The host 3 is respectively connected to a plurality of user machines 4 by way of a communications network 7. The host 3, for example, is constituted as a server machine, mainframe machine, or the like.

The host 3, for example, comprises a data delivery part 3A and a rearrangement processor 3B. The data delivery part 3A is for acquiring content data for streaming delivery from the storage part 2 via the storage control device 1, and respectively delivering this content data to user machines 4 as a prescribed bit rate.

The rearrangement processor 3B rearranges content data stored in the storage part 2, and stores this data in sequence. Rearrangement processing can be carried out automatically based on an alert outputted from a prefetch operation controller 1F, which will be explained hereinbelow. Further, it is also possible to carry out rearrangement processing only for a region (logical volume) in which streaming-delivered file data is stored.

The host 3 reads content data from a storage system, and, as it does so, sends the read-out content data to each user machine 4 in accordance with a prescribed bit rate. A user machine 4, for example, is constituted as a personal computer, workstation, or mobile information terminal.

Here, for example, a SAN (Storage Area Network) or the like can be used as a communication channel 5, 6, and a LAN (Local Area Network) or the Internet can be used as a communications network 7. However, the present invention is not limited to SAN and LAN, and is capable of supporting a variety of communications networks and communications protocols.

The constitution of the storage control device 1 will be explained. The storage control device 1, for example, is constituted as a controller for a disk array subsystem. But the storage control device 1 is not limited to this, and can also be constituted as a switching device disposed between the host 3 and the storage part 2.

In the following explanation, the example used is of a storage control device 1, which is constituted as one part of a disk array subsystem, but the present invention is not limited to this. The storage control device 1, for example, can comprise an I/O request processor 1A, a cache memory 1B, a prefetch part 1C, a fragmentation detector 1D, a prefetch quantity calculator 1E, and a prefetch operation controller 1F.

An I/O request processor 1A is for processing an I/O request issued from the host 3. For example, a read access and a write access can be cited as examples of an I/O request.

When the host 3 requests a read access, the I/O request processor 1A determines whether or not the requested data resides in the cache memory 1B. When the requested data is stored in the cache memory 1B, the I/O request processor 1A reads this data and transfers it to the host 3. When the requests data is not stored in the cache memory 1B, the I/O request processor 1A accesses the storage part 2, reads out the data, and, after storing this data in the cache memory 1B, sends it to the host3.

When the host 3 requests a write access, the I/O request processor 1A stores the write-requested data (write data) in the cache memory 1B, and reports write-complete to the host 3. Thereafter, the I/O request processor 1A writes the write data stored in the cache memory 1B to the storage part 2 at the appropriate timing. Or, the I/O request processor 1A can also report write-complete to the host 3 after writing the write data to the storage part 2.

Furthermore, the host 3, for example, can also request the deletion of data stored in the storage part 2, and/or that the constitution of the storage part 2 (volume configuration) be changed.

The cache memory 1B, for example, is used for passing data between the host 3 and the storage part 2 as described hereinabove. Read data read out by the host 3, and write data written from the host 3 both pass through the cache memory 1B.

The prefetch part 1C reads from the storage part 2 beforehand data that is expected to be read by the host 3, and stores it in the cache memory 1B. The prefetch operation controller 1F controls the ON/OFF of the prefetch operation of the prefetch part 1C. Further, the prefetch part 1C stores data of a predetermined quantity (prefetch quantity) in the cache memory 1B in accordance with a prefetch quantity set by the prefetch operation controller 1F.

Furthermore, the unit (I/O size) of data read out by the prefetch part 1C does not have to coincide with the unit of data read out from the cache memory 1B by the host 3. For example, the prefetch part 1C can read out data in a larger unit than the unit of data read out from cache memory 1B by the host 3. Further, for example, it is also possible to improve the efficiency of a data read by changing the data read location (the I/O request destination address).

The fragmentation detector 1D corresponds to the "continuity determination part." The fragmentation detector 1D monitors the cache hit rate of read accesses issued from the host 3, and detects the extent of data fragmentation based on this cache hit rate. Data fragmentation means that the continuity of the data arrangement is lost, and the data on one or a series of files is stored nonconsecutively.

If the data inside the storage part 2 is consecutively arranged, and the data is read out in order ahead of a sequential read access from the host 3, the cache hit rate can be expected to increase. By contrast, when the cache hit rate drops despite the fact that the data is being read out in order, it can be inferred that data fragmentation is occurring, and that data, which is supposed to be in a consecutive arrangement, is stored in different places (blocks). Accordingly, the fragmentation detector 1D indirectly detects the disruption of the data arrangement inside the storage part 2 based on the cache hit rate.

In addition, by predicting the cache hit rate, the fragmentation detector 1D monitors the extent of data fragmentation even during the time that a prefetch operation is halted. That is, the fragmentation detector 1D determines whether or not a cache hit would have occurred if a prefetch operation would have been carried out while a prefetch operation was halted. Based on a predicted cache hit rate such as this, the fragmentation detector 1D is capable of detecting the fragmentation of data even during the time period that a prefetch operation is halted.

The prefetch quantity calculator 1E calculates the quantity of data to be prefetched by the prefetch part 1C. The prefetch quantity calculator 1E, for example, calculates an appropriate prefetch quantity based on the extent of fragmentation of the data arrangement detected by the fragmentation detector 1D, and the frequency of generation of read accesses by the host 3. For example, the prefetch quantity calculator 1E calculates a prefetch quantity so that the prefetch quantity diminishes as fragmentation of the data arrangement progresses.

The prefetch operation controller 1F controls the prefetch operation of the prefetch part 1C. The prefetch operation controller 1F controls whether or not a prefetch operation will be performed based on the extent of the data arrangement fragmentation detected by the fragmentation detector 1D. Further, the prefetch operation controller 1F sets in the prefetch part 1C a prefetch quantity for when a prefetch operation is carried out.

When the extent of data fragmentation becomes great, that is, when a prefetch operation cannot be expected to be effective, the prefetch operation controller 1F can make the determination to halt a prefetch operation. When a determination is made to halt a prefetch operation, the prefetch operation controller 1F can output an alert. When data fragmentation becomes minimal, that is, when a prefetch operation can be expected to be effective, the prefetch operation controller 1F can also make the determination to restart a prefetch operation.

The storage part 2 stores data utilized by the host 3. The storage part 2, for example, comprises at least one or more rewritable storage devices, such as a hard disk drive or a semiconductor memory drive. One or a plurality of logical volumes can be established on a physical storage region provided by one or a plurality of storage devices. The data of at least one or more files, which are accessed by the file system of the host 3, is stored in this logical volume.

The operation of this embodiment will be explained. Content data for streaming delivery by the host 3 is stored in the storage part 2. The host 3 reads out the content data from the storage part 2 by way of the storage control device 1, and sends a packet of this read-out content data to the respective user machines 4.

The prefetch part 1C reads out ahead of time from the storage part 2 the data to be read out by the host 3, and stores it in the cache memory 1B. The host 3 is thereby able to obtain the required data more quickly.

For example, when the host 3 initially reads out D1 from a prescribed location of the storage part 2, the prefetch part 1C reads out, from the storage part 2, D2 which can be expected to be read out subsequent to D1, prior to a read access being issued by the host 3, and stores D2 in the cache memory 1B.

Similarly, the prefetch part 1C reads out from the storage part data, which is arranged subsequent to D2, prior to a read access being issued by the host 3, and stores this data in the cache memory 1B. However, since data fragmentation is occurring inside the storage part 2, it is supposed that the data arranged subsequent to D2 inside the storage part 2 is not D3, but rather D5. In this case, D5 is stored right after D2 in the cache memory 1B. However, since the data to be requested by the host 3 will be D3 not D5, a cache miss occurs.

The fragmentation detector 1D detects the degree of data fragmentation occurring inside the storage part 2 in accordance with the cache hit rate (or, conversely, in accordance with the cache miss rate). Data related to one or a plurality of files to be read out sequentially by the host 3 should be consecutively arranged in order inside the storage part 2. Therefore, it is possible to determine that an increase in cache misses is due to the occurrence of fragmentation of the data arrangement inside the storage part 2.

When data fragmentation occurs inside the storage part 2, the prefetch quantity calculator 1E calculates a smaller prefetch quantity. This is because, if the quantity of data to be prefetched is smaller, the likelihood of a cache miss occurring can be reduced.

The prefetch operation controller 1F decides whether to operate or halt the prefetch part 1C in accordance with the degree of fragmentation of the data arrangement inside the storage part 2. When cache misses increase (when the cache hit rate declines), the prefetch operation controller 1F halts the operation of the prefetch part 1C.

When the prefetch operation is halted, the I/O request processor 1A reads the data requested by the host 3 from the storage part 2, and transfers it to the host 3. That is, after a prefetch operation is halted, each time a read access is issued by the host 3, data is read out from the storage part 2 and sent to the host 3. Therefore, after a prefetch operation is halted, read access response performance is dependent on the response performance of the storage part 2.

Then the prefetch operation controller 1F can output an alert after halting the prefetch operation. This alert indicates that a prefetch operation has been halted due to data fragmentation. This alert, for example, can be notified to an administrator either via a management program running on the host 3, or via a management terminal connected to the storage control device 1. In addition, this alert can also be used to automatically start the rearrangement processor 3B.

However, when the fragmentation of the data arrangement inside the storage part 2 drops below a predetermined value, this drop in the extent of the fragmentation of the data arrangement is detected by the fragmentation detector 1D. For example, fragmentation is annulled when the rearrangement of the data inside the storage part 2 is completed by the rearrangement processor 3B. Or, when the fragmentation of the data arrangement inside the storage part 2 is partial, the extent of fragmentation is reduced when a read access for the host 3 passes through this fragmentation generation region.

The prefetch operation controller 1F restarts the operation of the prefetch part 1C when the extent of the fragmentation of the data arrangement decreases. The prefetch quantity calculator 1E calculates a prefetch quantity that is considered appropriate. The prefetch operation controller 1F sets the calculated prefetch quantity in the prefetch part 1C. The prefetch part 1C thereby reads data out from the storage part 2 ahead of a read access from the host 3 and stores it in the cache memory 1B. As a result of this, the response performance for read access increases.

A storage system of this embodiment, as explained hereinabove, is constituted for controlling the operation of a prefetch part 1C using a fragmentation detector 1D. That is, in this embodiment, a prefetch operation can be carried out under conditions, which can be expected to be effective, and can be halted under conditions, which can be expected not to be effective. As a result, this embodiment, can guarantee response performance that is greater than the original response performance of the storage part 2, thus enhancing reliability and usability.

If data of a relatively large quantity is prefetched despite the fact that fragmentation of the data arrangement is occurring, cache misses will occur in large numbers. Therefore, in this case, storage system response performance declines in comparison to reading out data directly from the storage part 2 when a read access is issued. By contrast, in this embodiment, when data inside the storage part 2 is arranged consecutively (when fragmentation of the data arrangement is not occurring), a prefetch operation is performed, and the prefetch effect is achieved. Further, when fragmentation of the data arrangement inside the storage part 2 is occurring, data can be sent to the host 3 at the response performance of the storage part 2 by halting a prefetch operation.

In this embodiment, the constitution is such that the extent of fragmentation of the data arrangement is indirectly inferred based on the cache hit rate. That is, in this embodiment, by utilizing the cache hit rate as an index of the extent of fragmentation of the data arrangement, it is possible to detect the fragmentation of the data arrangement without examining the actual data arrangement inside the storage part 2. Therefore, the fragmentation of the data arrangement can be detected at a relatively small load without the need for scanning the data contents of the storage part 2, and a drop in the performance of the storage control device 1 can be prevented pursuant to data arrangement fragmentation detection.

In this embodiment, the constitution is such that an alert is outputted when a prefetch operation is halted due to the fragmentation of the data arrangement. Therefore, an administrator (the user of the host 3 or storage control device 1), on the basis of this alert, for example, can either order the execution of rearrangement processing, or can adjust the number of streaming delivery users or the bit rate, thereby enhancing usability. Further, in this embodiment, since the rearrangement processor 3B can be automatically started by the above-mentioned alert, usability is enhanced even more. This embodiment will be explained in detail hereinbelow.

First Embodiment

Figure 2:
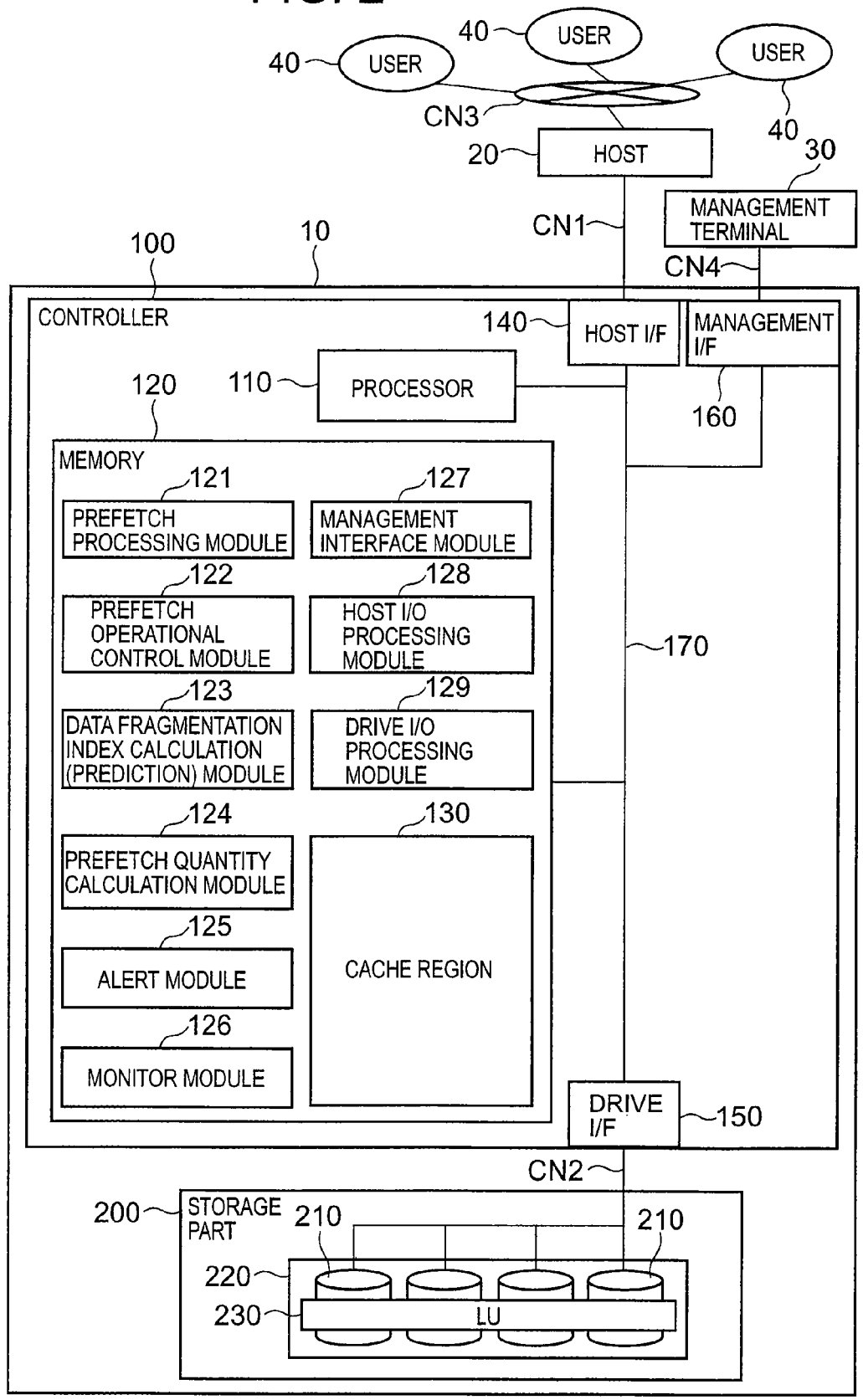
FIG. 2 is a block diagram showing the constitution of a storage system.

FIG. 2 is a schematic diagram showing the overall constitution of a storage system 10 according to this embodiment. The storage system 10, for example, can be constituted comprising a controller 100 and a storage part 200. The storage system 10 is connected to at least one or more hosts 20.

First, the corresponding relationship between FIG. 1 and FIG. 2 will be described. The controller 100 corresponds to the storage control device 1, the storage part 200 corresponds to the storage part 2, the host 20 to the host 3, the user machine 40 to the user machine 4, the communication channel CN1 to the communication channel 5, the communication channel CN2 to the communication channel 6, and the communication network CN3 to the communication network 7, respectively.

The storage system 10, for example, is connected to the host 20 via the communication channel CN1 of a SAN or LAN. The host 20 is connected to each of a plurality of user machines 40 via the communication network CN3. A user machine 40, for example, is a personal computer or mobile information terminal. The host 20 reads out data from the storage system 10 in accordance with a delivery request from a user machine 40. Then, the host 20 delivers this read-out data (content data) to each of the user machines 40 at a prescribed bit rate. This data transfer procedure is called streaming delivery.

Further, the storage system 10, for example, is connected to a management terminal 30 via the communication channel CN4 of a LAN or the like. The management terminal 30 carries out management by setting the configuration of the storage system 10, and collecting the various states inside the storage system 10. The management terminal 30 can also be connected to a management server over a network. Furthermore, it is also possible to discontinue the management terminal 30, and manage the configuration of the storage system 10 inside the host 20.

Next, the internal configuration of the storage system 10 will be explained. First of all, the configuration of the controller 100 will be explained, and next the configuration of the storage part 200 will be explained.

The controller 100, for example, is configured comprising a processor 110, memory 120, host interface ("host I/F" in the figure) 140, drive interface ("drive I/F in the figure) 150, and management interface ("management I/F" in the figure) 160. These respective parts 110, 120, 140, 160 are interconnected by a bus 170.

The processor 110, for example, is constituted from at least one or more microprocessors (CPU). There are also times when a plurality of CPU cores is disposed inside a single processor 110. The processor 110 realizes each of various functions, which will be explained hereinbelow, by reading and executing a program module stored in the memory 120. Furthermore, this embodiment is not limited to a constitution, which respectively achieves all of the plurality of functions via software processing. As needed, a portion of a function can also be constituted via hardware circuitry, or a portion of one or a plurality of functions can be supported by hardware circuitry. Such hardware circuitry, for example, is constituted as large-scale integration (LSI), and is connected to the bus 170.

The memory 120 comprises a program region for storing program modules 121 through 129, and a cache region 130 for storing cache data. In this embodiment, a constitution in which programs and cache data are mixed inside the memory 120 is shown, but instead of this, it can also be a constitution, which is separated into a program memory for storing programs, and a cache memory for storing cache data. Therefore, in the below explanation, there will be instances when the cache region 130 is called a cache memory. The cache region 130 corresponds to the "cache memory 1B" in FIG. 1.

A prefetch processing module 121 is a program module for carrying out a prefetch, and corresponds to the "prefetch part 1C" in FIG. 1.

A prefetch operational control module 122 is a program module for controlling the operation of the prefetch processing module 121. The prefetch operational control module 122 corresponds to the "prefetch operation controller 1F" in FIG. 1. The prefetch operational control module 122, as will be explained hereinbelow, is constituted so as to set an appropriate prefetch quantity in the prefetch processing module 121, and to instruct the halting and restarting of a prefetch operation in accordance with the extent of fragmentation of the data arrangement.

A data fragmentation index calculation (prediction) module 123 is a program module for either detecting or predicting the extent of data arrangement fragmentation inside the storage part 200 on the basis of a cache hit rate. A data fragmentation index is an index, which shows the extent of fragmentation of a data arrangement. The data fragmentation index calculation (prediction) module 123 corresponds to the "fragmentation detector 1D" in FIG. 1. Hereinafter, the data fragmentation index calculation (prediction) module 123 will simple be called the data fragmentation index calculation module 123. The data fragmentation index calculation module 123 indirectly detects the fragmentation of the data arrangement based on the cache hit rate while a prefetch operation is being carried out. Further, even when a prefetch operation is halted, the data fragmentation index calculation module 123 predicts the fragmentation of the data arrangement based on a cache hit rate postulated on a prefetch having been performed.

A prefetch quantity calculation module 124 is a program module for calculating a prefetch quantity, and corresponds to the "prefetch quantity calculator 1E" in FIG. 1. The prefetch quantity calculation module 124 calculates an appropriate prefetch quantity in accordance with a data fragmentation index outputted from the data fragmentation index calculation module 123. Simply put, for example, the prefetch quantity calculation module 124 calculates a prefetch quantity such that the greater the data fragmentation, the smaller the prefetch quantity. A calculated prefetch quantity is set in the prefetch processing module 121 by the prefetch operational control module 122.

An alert module 125 is a program module for issuing a prescribed alert based on instructions from the prefetch operational control module 122. This alert, for example, is notified to an administrator via the user interface of the host 20 or the management terminal 30. Or, this alert can also be used as an opportunity to start rearrangement processing inside the host 20 for doing away with the fragmentation of the data arrangement.

A monitor module 126 is a program module for managing various statistical information and logs managed inside the storage system 10. The monitor module 126, for example, manages such information as the cache hit rate, the timing of I/O requests from the host 20, and the size of accessed data.

A management interface module 127 is a program module for carrying out a storage system 10 operation setting and configuration change from the host 20 or the management terminal 30.

A host I/O processing module 128 is a program module for processing a read access (read request) or write access (write request) from the host 20.

A drive I/O processing module 129 is a program module for accessing a disk drive 210 inside the storage part 200, and either reading out data from the disk drive 210, or writing data to the disk drive 210. The host I/O processing module 128 and the drive I/O processing module 129 correspond to the "I/O request processor 1A" in FIG. 1.

The host interface 140 carries out communications with the host 20 via the communication channel CN1. The drive interface 150 carries out communications with a disk drive 210 inside the storage part 200 via the communication channel CN2. The management interface 160 carries out communications with the management terminal 30 via the communication channel CN4.

When the host 20 is a so-called open server, the host 20 and storage system 10, for example, carry out data communications in accordance with a protocol, such as the TCP/IP (Transmission Control Protocol/Internet Protocol) or FCP (Fibre Channel Protocol). When the host 20 is a mainframe machine, the host 20 and the storage system 10, for example, carry out data communications in accordance with a protocol, such as FICON (Fibre Connection: Trademark), ESCON (Enterprise System Connection: Trademark), ACONARC (Advanced Connection Architecture: Trademark), or FIBARC (Fibre Connection Architecture: Trademark).

Next, the constitution of the storage part 200 will be explained. The storage part 200, for example, comprises a plurality of disk drives 210. Various types of storage devices can be utilized as disk drives 210, such as, for example, a hard disk drive, semiconductor memory drive, optical disk drive, magneto-optic disk drive, or magnetic tape drive. Further, when a hard disk drive is used, for example, a variety of different types of hard disk drives can be used, like an FC (Fibre Channel) disk drive, SATA (Serial AT Attachment) disk drive, and SCSI (Small Computer System Interface) disk drive. In addition, different types of storage devices can also be mixed inside the storage part 200.

The storage part 200 can also constitute a RAID group 220 by virtue of a prescribed number of disk drives 210, which will differ in accordance with the RAID level. For example, a RAID 5 constitution can be obtained from three data disk and one parity disk (3D+1P). Also, a RAID 1 constitution can be obtained from one primary disk and one secondary disk.

The RAID group 220 is a redundant physical storage region, and can also be called a physical storage device. Either one or a plurality of logical storage regions 230 can be established on the physical storage region that this RAID group 220 provides. A logical storage region 230, for example, is called a logical volume (displayed as "LU" in the figure). This logical volume 230 becomes the access target of the host 20.

Data (content data) targeted for streaming delivery is stored in a disk drive 210 (logical volume 230) inside the storage part 200. The content data, for example, comprises video, voice and so forth, and the size of the data is generally large. Content data differs from a database, which is randomly accessed, and from a program code, which can only be read out in response to a required command, and is used by being read out in sequential order from the head of the data. Since content data is most often read out consecutively in sequential order, it is consecutively arranged in consecutive regions on a logical volume 230.

Furthermore, the storage part 200 can comprise at least one or more disk drives 210, and does not necessarily comprise a plurality of disk drives 210. A logical volume 230 can also be established on a single disk drive 210.

Further, the controller 100 and the storage part 200 can be disposed inside the same chassis, or they can be disposed in respectively different chassis. Also, a prefetch operational control function, which will be explained hereinbelow, can also be implemented, for example, in a switching device disposed on the communication channel CN1.

Next, the operation of this embodiment will be explained. The respective operations described hereinbelow are realized by the processor 110 of the controller 100 reading out and executing, as required, the respective program modules 121 through 129 stored in the memory 120. To expedite the explanation, the controller 100 will be referred to as the operation unit.

Before explaining the operation of the storage system, a characteristic problem taken into consideration by the storage system of this embodiment will be explained. This characteristic problem will be helpful in understanding the present invention. However, the scope of the present invention shall be determined on the basis of the disclosure of the claims, and the below-described characteristic problem will not restrict the scope of the present invention in any way.

In this embodiment, as explained hereinabove, data is sent to the respective user machines 40 from the host 20 at a prescribed bit rate. In this kind of streaming delivery, since individual delivery requests are generally issued from the respective user machines 40, the host 20 must send data simultaneously and in parallel to each of a plurality of user machines 40.

That is, in order for a large number of users to view the same content (a movie or the like) separately at the same time, streaming delivery is executed by multiplexing. Content data stored inside a certain logical volume 230 is read out and delivered to a certain user machine 40, and content data stored inside a different logical volume 230 is read out and delivered to another certain user machine 40.

As a result of this, highly multiplexed sequential accesses are generated to the storage system 10 from the host 20. That is, for the host 20 to carry out streaming delivery to each user machine 40, it issues a large number of sequential accesses (read accesses) simultaneously.

If each streaming delivery is viewed individually, the respective I/O requests from the host 20 to the storage system 10 are sequential. In other words, if the focus is on individual streaming deliveries, consecutive data readouts are performed. However, as explained hereinabove, since a large number of streaming deliveries is processed simultaneously and in parallel, the storage system 10 receives an I/O request corresponding to each of the respective streaming deliveries. Since a plurality of sequential accesses exist between the host 20 and the storage system 10, this plurality of sequential accesses in its entirety cannot be seen as a sequential access. This embodiment controls a prefetch operation (the prefetch function) by taking this characteristic into consideration.

Stated further, since streaming delivery to each user machine 40 is carried out independently, the host 20 respectively reads out the data required by each user machine 40 in sequential order from the storage system 10. The point that needs to be noted here is that data, which is prefetched and stored in the cache region 130, is basically not utilized a second time after being read out by the host 20. In the case of streaming delivery, as a rule, data, which has been used one time, is not used a second time. This point differs from a cache control technique designed simply for speeding up memory access, and from technology for increasing program execution speed.

Figure 3:
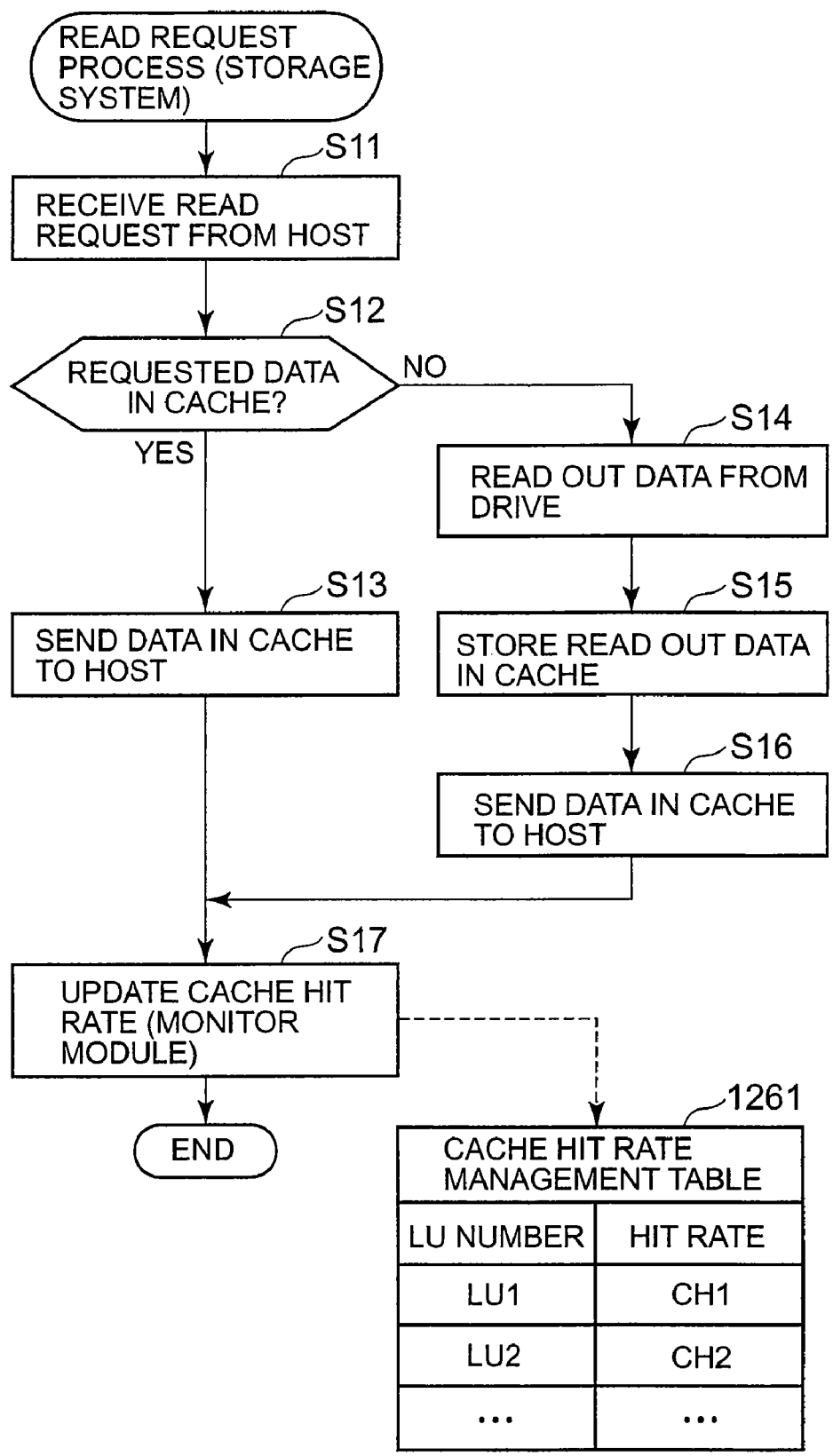
FIG. 3 is a flowchart showing a read request process.

FIG. 3 is a flowchart showing a read request process for processing a read request from the host 20. This read request process is achieved primarily by the host I/O processing module 128 of the controller 100 (or the host I/O processing module 128 and the drive I/O processing module 129).

Furthermore, the respective flowcharts described hereinbelow present overviews of processing to the extent needed to understand and implement the present invention, but there are cases in which this processing will differ with an actual program. Further, processing steps will be abbreviated as "S".

The controller 100, upon receiving a read request from the host 20 (S11), makes a determination as to whether or not the requested data is stored in the cache region 130 (S12). In this embodiment, it is possible to store data in the cache region 130 ahead of time prior to a read request being issued.

When the data requested by the host 20 is already stored in the cache region 130 (S12: YES), the controller 100 reads out the data stored in the cache region 130 and sends it to the host 20 (S13). Then, the controller 100 updates the cache hit rate (S17). The updating of this cache hit rate is executed by the monitor module 126. The monitor module 126 comprises a cache hit rate management table 1261. This management table 1261, for example, is information for corresponding and managing the various cache hit rates of the respective logical volumes 230. Generally speaking, most often the host 20 file system controls one logical volume 230 in its entirety, and content data is stored in each of the respective logical volumes 230. Since data arrangement fragmentation will differ for each file system, the various cache hit rates are managed by logical volume 230.

When the data requested by the host 20 is not stored in the cache region 130 (S12: NO), the controller 100 accesses a disk drive 210 inside the storage part 200, and reads out the data (S14). More specifically, for example, the controller 100 converts the logical address of the readout destination specified inside the read command to a physical address on a drive, and extracts the data from a prescribed disk drive 210. A prescribed disk drive 210 is a disk drive, which constitutes the logical volume 230 in which the requested data is held.

The controller 100, after storing the data read out from the disk drive 210 in the cache region 130 (S15), sends this data to the host 20 (S16), and updates the cache hit rate (S17).

The above-mentioned flow from S12 to S13 is a case in which the prefetch effect occurs, and the flow from S12 to S14 to S15 to S16 is a case in which the prefetch effect does not occur (a case in which a prefetch operation is halted, or a cache miss occurs).

Figure 4:
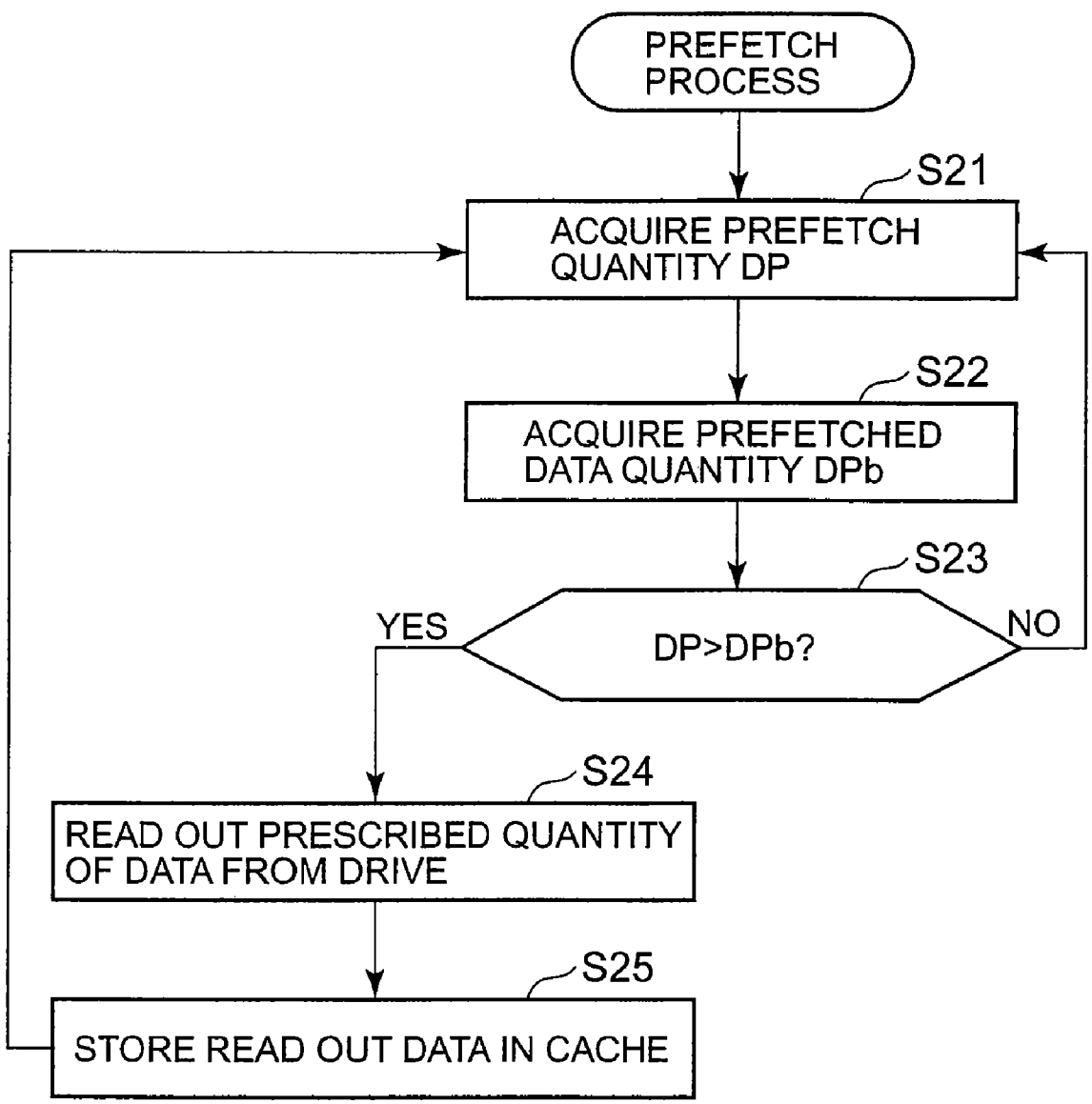
FIG. 4 is a flowchart showing a prefetch process.

FIG. 4 is a flowchart showing a prefetch process. This process is achieved primarily by the prefetch processing module 121 of the controller 100. The controller 100 acquires a prefetch quantity DP (S21). This prefetch quantity DP is set during the prefetch operational control process, which will be explained hereinbelow together with FIG. 5. The prefetch quantity DP is adjusted as needed in accordance with the data fragmentation index.

The controller 100 acquires a data quantity DPb, which has already been prefetched to the cache region 130 (S22), and compares the prefetch quantity DP against the prefetched data quantity DPb (S23).

When the prefetched data quantity DPb is smaller than the prefetch quantity DP (S23: YES), the controller 100 reads out a prescribed quantity of data from a disk drive 210 (S24), and stores it in the cache region 130 (S25). Then, the controller 100 returns to S21. By so doing, steps S21 through S25 are repeated until the set prefetch quantity DP worth of data is stored in the cache region 130.

When the prefetched data quantity DPb is larger than the prefetch quantity DP (S23: NO), the controller 100 returns to S21 without prefetching new data. Furthermore, each time prefetched data is read out by the host 20, the value of the prefetched data length DPb decreases.

Figure 5:
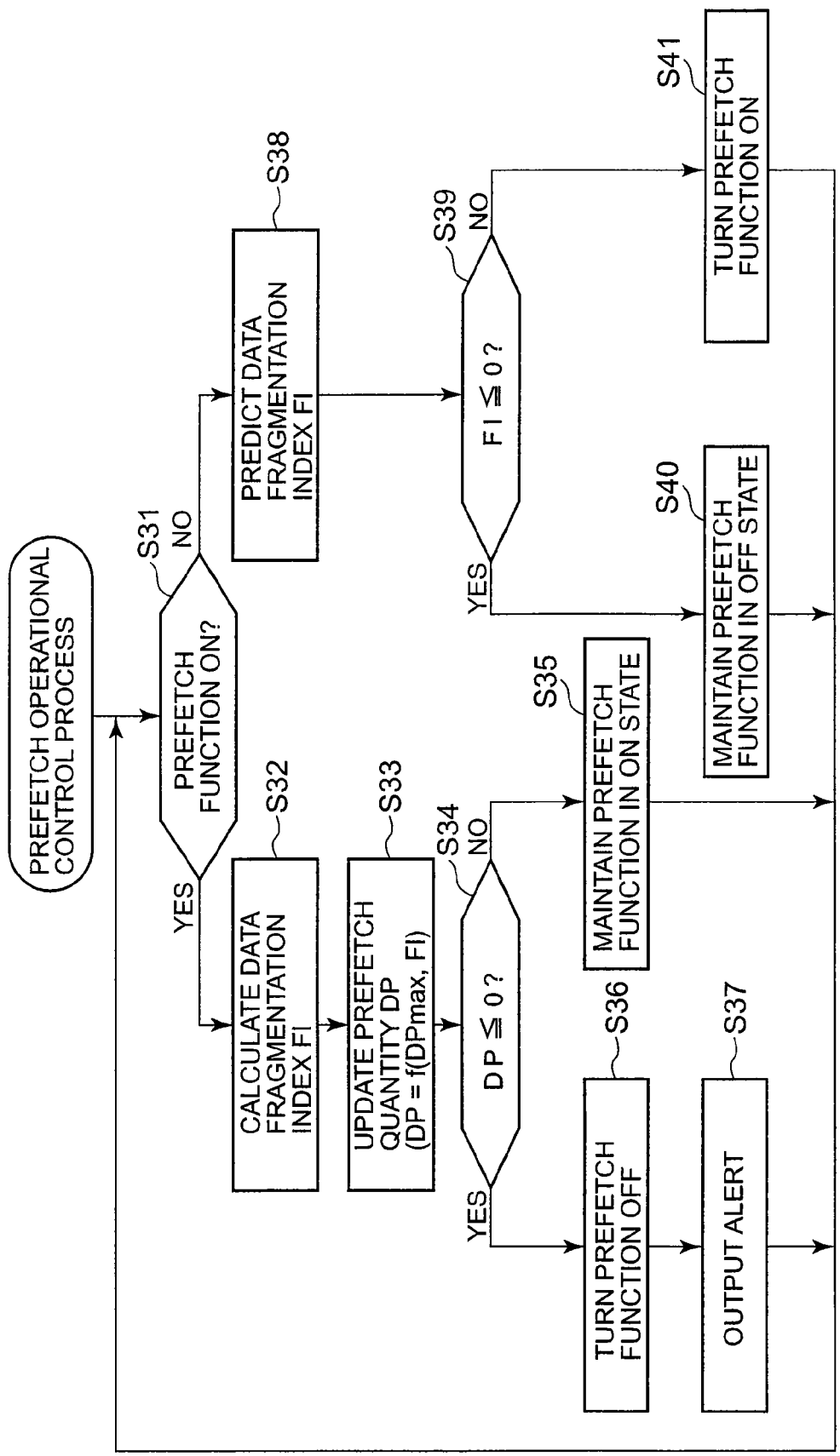
FIG. 5 is a flowchart showing processing for controlling a prefetch operation.

FIG. 5 is a flowchart showing a prefetch operational control process. This process is achieved primarily by the prefetch operational control module 122 of the controller 100. This process, for example, is executed each time a read access is received from the host 20. Instead of this, for example, prefetch operational control processing can also be executed at a prescribed cycle of a few seconds.

The controller 100 determines whether a prefetch operation is ON or not (S31). A prefetch operation is ON when the prefetch function is operating. A prefetch operation is OFF when the prefetch function is stopped.

When the prefetch function is set to ON (S31: YES), the controller 100 calculates a data fragmentation index FI (S32). The method for calculating a data fragmentation index FI will be explained below together with FIG. 6. Simply put, the controller 100 detects the fragmentation of the data arrangement inside a logical volume 230 as the data fragmentation index FI based on the cache hit rate.

Next, the controller 100 calculates a prefetch quantity DP based on a data fragmentation index FI and a maximum prefetch quantity DPmax (S33). The method for calculating a maximum prefetch quantity DPmax will be explained below together with FIGS. 9 and 10. The controller 100 determines the latest prefetch quantity DP by inputting a data fragmentation index FI and maximum prefetch quantity DPmax into a prefetch quantity calculation function f provided in advance (DP=f(DPmax, FI)).

For example, a prefetch quantity DP can be obtained by multiplying a data fragmentation index FI by a maximum prefetch quantity DPmax (DP=DPmax×FI). As will be explained hereinbelow, a data fragmentation index FI will decrease from "1" to "0" as the fragmentation of a data arrangement progresses. When data arrangement fragmentation has advanced the furthest, FI constitutes either "0" or a negative value. When data arrangement fragmentation is not occurring, FI constitutes "1". Therefore, a prefetch quantity DP obtained by multiplying a data fragmentation index FI by a maximum prefetch quantity DPmax that is a positive value will become smaller the more the fragmentation of the data arrangement progresses. Furthermore, the above explanation is a simplified example, and the present invention is not limited to this. A function, which is capable of reducing the prefetch quantity DP to the extent that data arrangement fragmentation progresses, can also be used. Further, instead of a calculation method that uses a function, the present invention can also be constituted such that a prefetch quantity is determined by preparing a table, which describes the corresponding relationship between a prefetch quantity DP and a data fragmentation index FI, and then referencing this table.

The controller 100, after calculating a prefetch quantity DP (S33), determines whether this calculated prefetch quantity DP is less than 0 (S34). As explained hereinabove, when data arrangement fragmentation progresses, the value of FI becomes 0. When FI becomes 0, the prefetch quantity DP also becomes 0.

When the prefetch quantity DP is 0 (S34: YES), the controller 100 halts the prefetch function (S36). When the prefetch function transitions from ON to OFF, the controller 100 outputs an alert (S37). This alert is generated by the alert module 125. A generated alert is sent from the management interface module 127 to the communication channel CN1 by way of the host interface 140, and is received by the host 20.

A user can confirm that the prefetch function is stopped in accordance with an alert from the controller 100. Furthermore, as will be explained hereinbelow, a data rearrangement process can be automatically executed inside the host 20 in accordance with an alert from the controller 100.

When a prefetch quantity DP calculated in S33 is not 0 (S34: NO), the controller 100 maintains the prefetch function in the ON state (S35). In this case, the controller 100 executes the prefetch processing described in FIG. 4 based on the prefetch quantity DP calculated in S33.

When the prefetch function is set to OFF (S31: NO), the controller 100 predicts a data fragmentation index FI (S38). The method for predicting a data fragmentation index FI will be explained hereinbelow.

The controller 100 determines whether the predicted data fragmentation index FI is less than 0 (S39). When the data fragmentation index FI is less than 0 (S39: YES), the continuity of the content data stored inside a logical volume 230 is lost, and no prefetch effect can be expected. Accordingly, the controller 100 maintains the prefetch function in the OFF state as-is (S40). During the period in which the prefetch function is stopped, the controller 100 reads out data from a disk drive 210 and sends it to the host 20 at the point in time at which a read access is issued from the host 20.

By contrast to this, when the data fragmentation index FI predicted in S38 is a value greater than 0 (S39: NO), the extent of data fragmentation is lessening, and the prefetch effect can be expected. Accordingly, the controller 100 transitions the prefetch function from OFF to ON (S41).

Thus, the controller 100 performs ON/OFF control of a prefetch operation in accordance with a data fragmentation index FI. Further, when the prefetch operation is available (when the prefetch function is set to ON), the controller 100 uses an appropriate prefetch quantity DP that corresponds to a data fragmentation index FI. Therefore, the storage system 10 can properly control a prefetch operation in accordance with the degree of data fragmentation.

Figure 6:
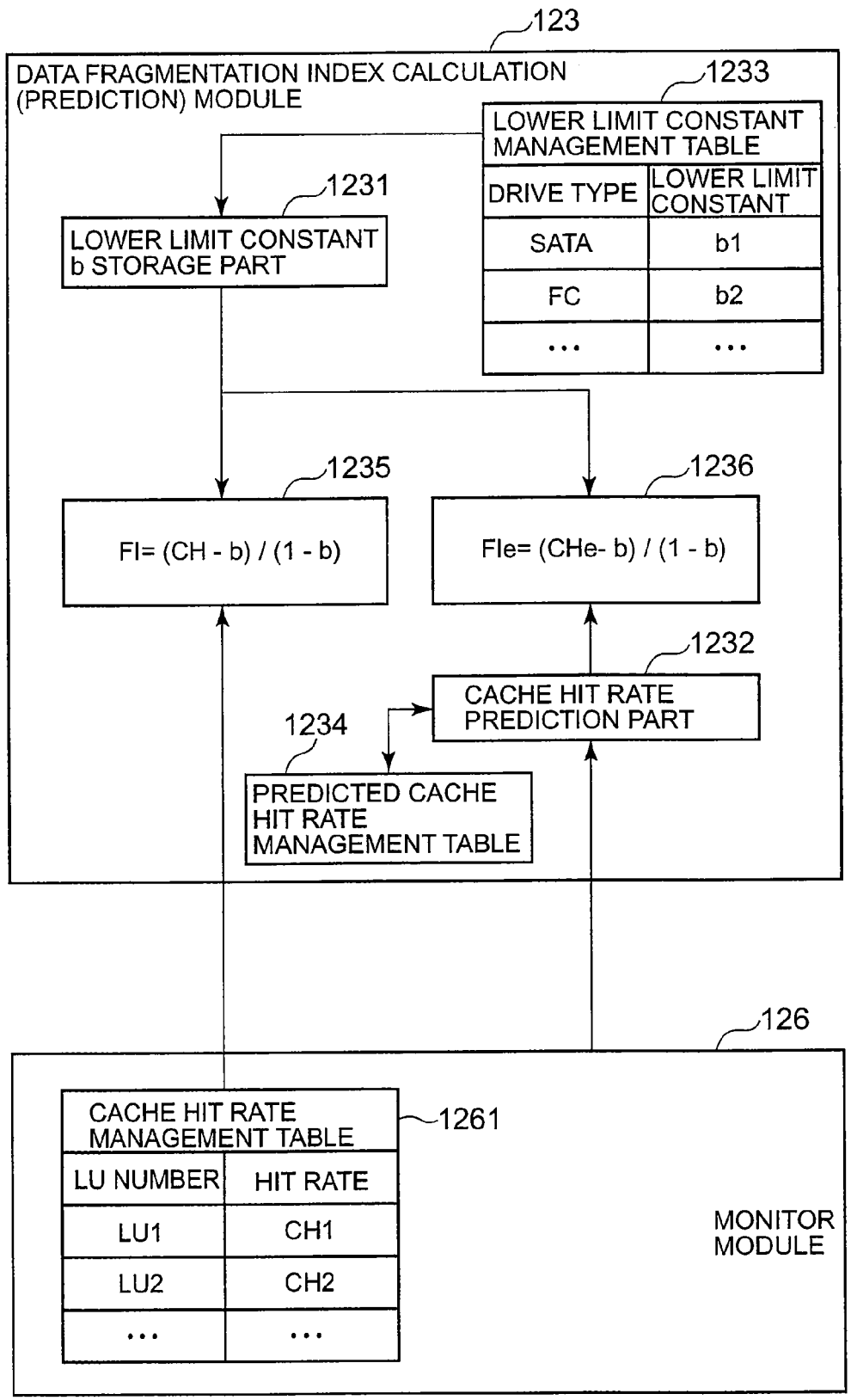
FIG. 6 is a diagram schematically showing a state wherein the extent of data arrangement fragmentation is detected.

FIG. 6 is a diagram schematically showing a method for detecting (predicting) a data fragmentation index FI. The data fragmentation index calculation module 123, for example, can be constituted comprising a lower limit constant storage part 1231, a cache hit rate prediction part 1232, a lower limit constant management table 1233, a predicted cache hit rate management table 1234, and a plurality of operational expressions 1235, 1236.

A constant b to be used in the operational expressions 1235, 1236 is stored in advance in the lower limit constant storage part 1231. The constant b, for example, is a value obtainable by measuring the relationship between the cache hit rate and the response performance, and checking for a cache hit rate, which will not enable the prefetch effect to be achieved. That is, the constant b shows the limit beyond which the prefetch effect cannot be achieved. The constant b takes a value that is greater than "0" but less than "1" ($0<b<1$).

When the type of disk drive 210 is determined beforehand, a preset fixed value can be used in the constant b. The constant b is dependent on the performance of the disk drive. When a plurality of types of disk drives 210 are supported, a lower limit constant management table 1233 can be prepared for storing a constant b in accordance with a type of disk drive. A constant b value for each type of disk drive is set in the lower limit constant management table 1233 beforehand. Furthermore, it is also possible for the host 20 and management terminal 30 to set a constant b.

The cache hit rate prediction part 1232 is used when the prefetch function in OFF, and makes a determination as to whether a read access from the host 20 is a cache hit or a cache miss. The prediction result is stored in the predicted cache hit rate management table 1234. In this predicted cache hit rate management table 1234, similar to the cache hit rate management table 1261 described hereinabove, a predicted cache hit rate corresponds to each of the respective logical volumes 230.

A first operational expression 1235 is used when the prefetch function is ON. The first operational expression 1235 calculates a data fragmentation index FI from an actual measured cache hit rate CH ($0 \leq CH \leq 1$) and a constant b ($0<b<1$) in accordance with Equation 1 below.

$$FI=(Ch-b)/(1-b) \quad \text{(Equation 1)}$$

A second operational expression 1236 is used when the prefetch function is OFF. The second operational expression 1236 predicts a data fragmentation index FIe from a predicted cache hit rate CHe ($0 \leq CHe \leq 1$) and a constant b in accordance with Equation 2 below.

$$FIe=(Che-b)/(1-b) \quad \text{(Equation 2)}$$

The storage system 10 of this embodiment, which is used in streaming delivery, carries out a prefetch operation on the supposition that data is sequentially arranged on a drive (inside a logical volume 230). Therefore, when the data arrangement in a drive is fragmented, prefetch can fail. Since the data requested by the host 20 does not reside in the cache region 130 at this time, a cache miss occurs, and the cache hit rate decreases. Therefore, the extent of the fragmentation of the data arrangement can be detected by making the cache hit rate CH an index. The extent of the fragmentation of the data arrangement can be determined without actually scanning the inside of a drive.

The cache hit rate CH is one of the statistical information managed by the monitor module 126, and, for example, is stored in the cache hit rate management table 1261. Since data requested by the host 20 always resides in the cache region 130 when a prefetch is completely successful, the cache hit rate approaches "1 (100%)". By contrast with this, the more prefetch fails, the closer to "0" the cache hit rate CH becomes.

That is, when data is arranged perfectly sequentially on a drive, the data arrangement fragmentation index FI defined by the first operational expression 1235 generally becomes the maximum value of "1", and gradually becomes a smaller value as data arrangement fragmentation progresses. Then, when data arrangement fragmentation progresses to the point at which the prefetch effect cannot be achieved, the data fragmentation index FI becomes "0". In other words, the prefetch function can be set to OFF when the data arrangement fragmentation index FI is "0" or less, and the prefetch function can be set to ON when the FI is greater than "0".

The second operational expression 1236 defines the data fragmentation index FI the same as the first operational expression 1235 for the reasons stated in the first operational expression 1235. The second operational expression 1236 uses a constant b that is common to the first operational expression 1235. Therefore, FI approaches "0" the more the fragmentation of the data arrangement progresses, and approaches "1" the more consecutive the data arrangement is.

Prediction of the data fragmentation index FI in accordance with the second operational expression 1236 is necessary for changing the prefetch function from the ON state to the OFF state. To predict an FI, a predicted value CHe must be used as the cache hit rate.

This is because, when the prefetch function is set to OFF, a cache hit rate Ch, which can actually be measured, will, as a rule, become 0% without a read access registering a cache hit regardless of whether the data arrangement is consecutive or fragmented. When a cache hit rate CH that can actually be measured is used, it is no longer possible to change the prefetch function from the OFF state to the ON state because the value of FI becomes a value approaching "0".

Here, for example, a method for confirming the cache hit rate by returning the prefetch function to the ON state at regular intervals during the period that the prefetch function is OFF can be considered. However, when a cache miss occurs in a method that experimentally carries out confirmations like this, the response performance (readout performance) of the storage system 10 drops sharply.

In other words, if it is supposed that the prefetch effect cannot be achieved when the prefetch function is turned ON experimentally, a cache miss occurs, and access to a disk drive 210 is carried out once again. Since this takes twice the time, the response performance of the storage system 10 when a prefetch fails is far worse than the response performance when a disk drive 210 is accessed from the beginning (at times called minimum guaranteed performance).

Accordingly, in this embodiment, a cache hit rate, which could be expected to be obtained if the prefetch function was ON, is predicted with the prefetch function in the OFF state as-is. This makes it possible to control the operation of the prefetch function without lowering the response performance of the storage system 10 below the minimum guaranteed performance.

Figure 7:
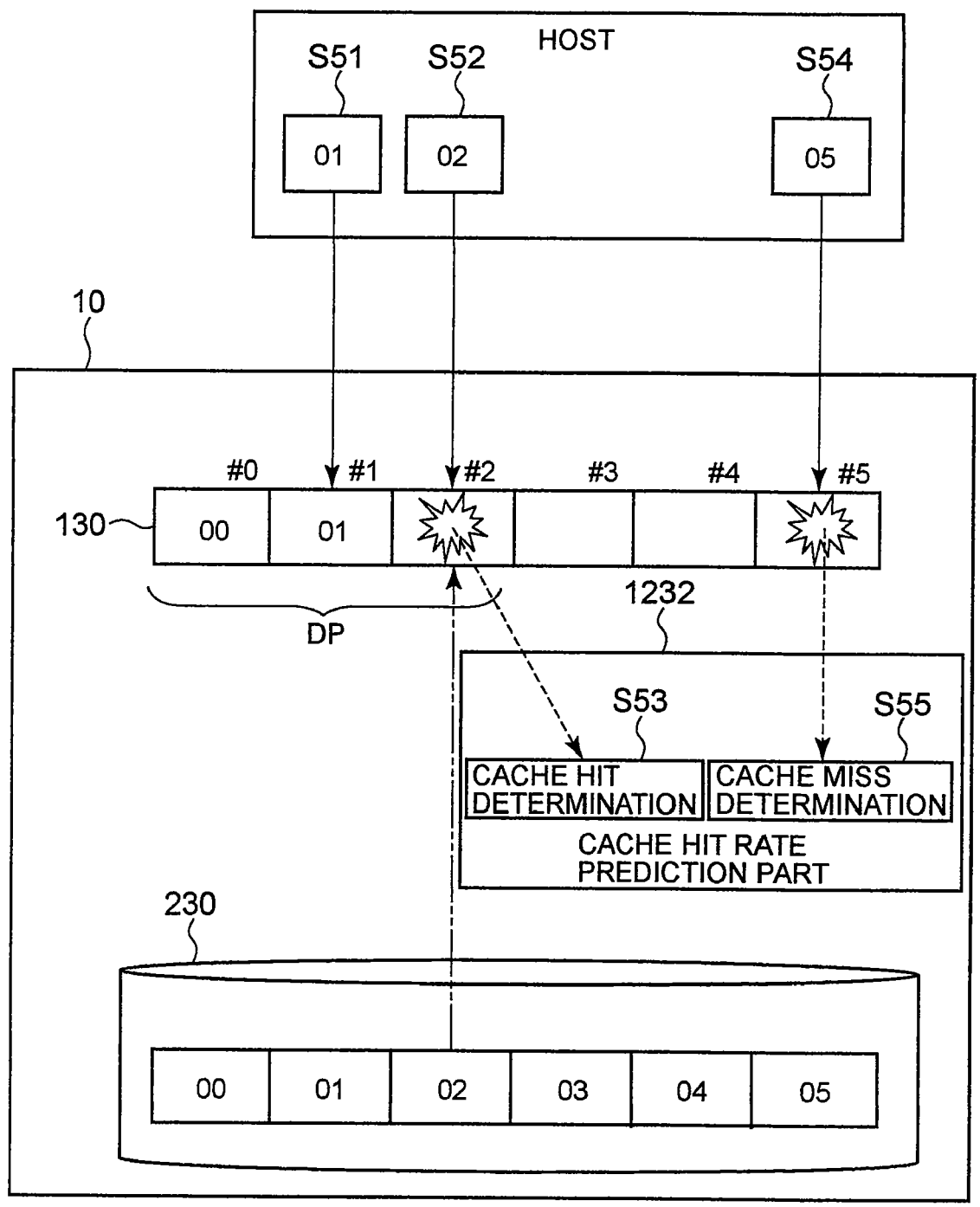
FIG. 7 is a diagram schematically showing a state wherein a cache hit rate is predicted within a period of time during which the prefetch function is set to OFF.

The cache hit rate prediction method will be explained on the basis of FIG. 7 and FIG. 8. FIG. 7 is a diagram schematically showing a state for obtaining a cache hit rate predicted value CHe with the prefetch function in the OFF state as-is.

First, a basic prefetch function will be explained. When the prefetch function is OFF, not one piece of data is stored in the cache region 130 at initialization. Therefore, for example, when a read request for data block "00" is issued by the host 20, the contents of data block "00" are sent to the host 20 after data block "00" has been read into the cache region 130. The contents of data block "00", which have been read into the cache region 130, remain in the cache region 130 as-is.

By comparison, when the prefetch function is ON, not one piece of data is stored in the cache region 130 at initialization. Therefore, the operation when the host 20 accesses the first data block "00" is the same as when the prefetch function is set to the OFF state. However, subsequent operations differ from when the prefetch function is in the OFF state.

In order to read data out in sequential order for streaming delivery, if a read request is issued for data block "00", the access destination of the next read request will be the second data block "01", which is adjacent to data block "00".

Therefore, when the contents of adjacent data block "00" are stored in the cache region 130, it is expected that data block "01", which follows this data block "00", will be read in. Similarly, when there is a read access to data block "01", a read access to data block "02", which is adjacent to this data block "01", is expected. Accordingly, when data blocks "00" and "01" exist in the cache region 130, the controller 100 stores the next data block "02" in the cache region 130 before a read access is issued from the host 20. That is, it prefetches the contents of data block "02".

By repeating this procedure, the contents of data blocks "03", "04" and "05" are prefetched in anticipation of read accesses from the host 20. Furthermore, the number of data blocks to be prefetched (the prefetch quantity DP) will not exceed the maximum prefetch quantity DPmax.

Next, a situation in which a cache hit rate is predicted with the prefetch function in the OFF state will be explained. It is supposed that the first data block "00" and second data block "01" of the content data are already stored in the cache region 130.

When the host 20 issues a read access to data block "01" (S51), since the contents of this data block "01" are already stored in the cache region 130, a cache hit occurs.

When the host 20 issues a read access to the third data block "02" (S52), since the prefetch function is set to OFF, the contents of data block "02" are not stored in the cache region 130. Thus, this read access will generate a cache miss.

However, when a cache hit rate is predicted, a cache miss related to data block "02" will be classified and stored as a cache hit (S53). This is because, if the data blocks "00" and "01" immediately prior to the read-requested data block "02" existed in the cache region 130, and the prefetch function had been set to ON, data block "02" would have been prefetched, and a cache hit would have been generated.

Furthermore, if a read access to data block "05" was issued subsequent to performing a read access to data block "01" (S54), since the contents of data block "05" are not stored in the cache region 130, a cache miss would occur. This cache miss would be classified as-is as a cache miss (S55). This is because, even if, for example, the prefetch function had been set to ON, without the data block "04" immediately prior to data block "05" being stored in the cache region 130, it would not be possible to avoid a cache miss.

Figure 8:
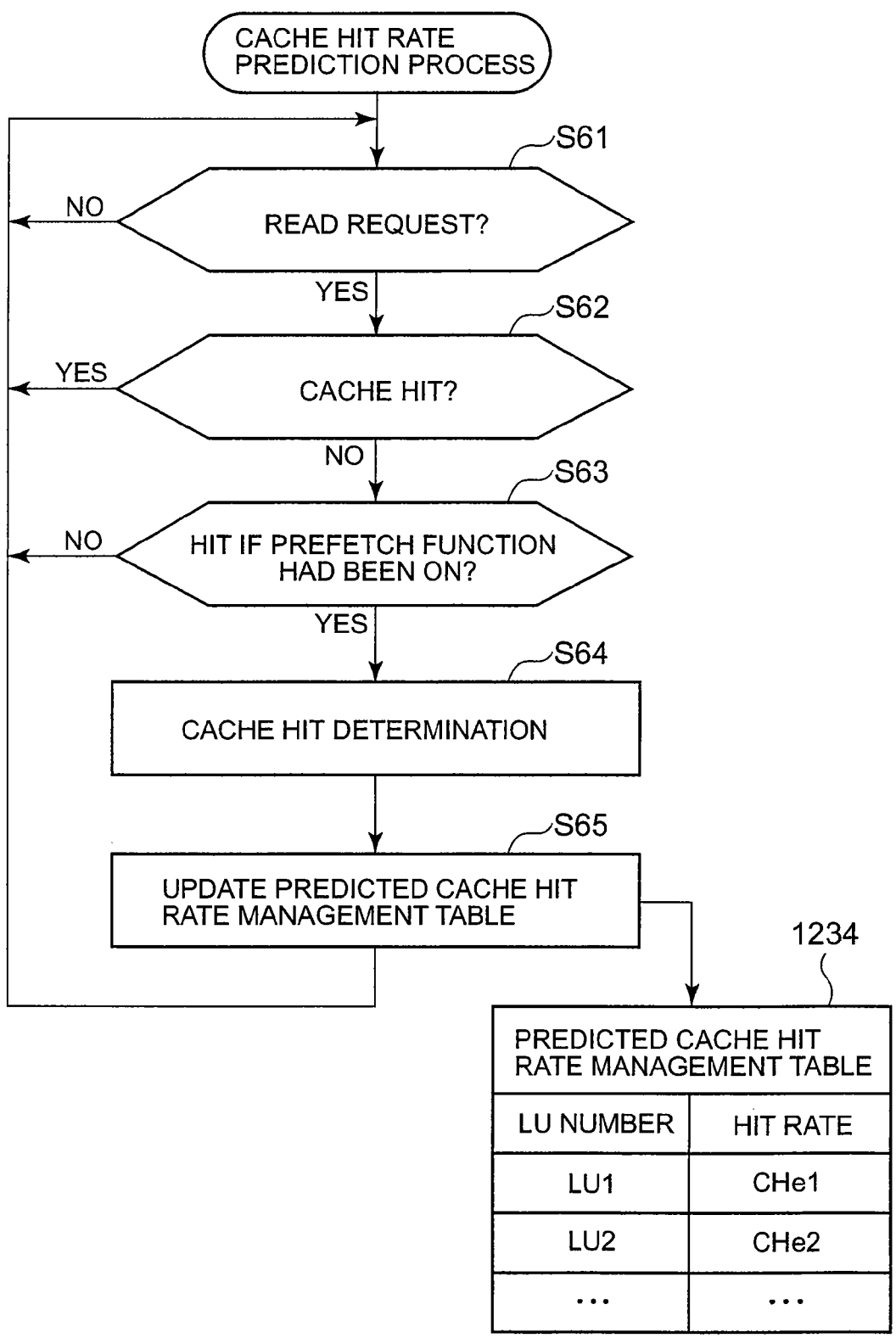
FIG. 8 is a flowchart showing the processing for predicting a cache hit rate.

FIG. 8 is a flowchart showing a cache hit rate prediction process. The basic thinking concerning the prediction process has already been described. Once again, when a read request is issued (S61: YES), the controller 100 determines whether or not the requested data is stored in the cache region 130 (S62).

When a cache miss is detected (S62: NO), the controller 100 determines whether or not it would have been a cache hit had the prefetch function been set to ON (S63). When a determination is made that it would have been a cache hit had the prefetch function been set to ON (S63: YES), the controller 100 counts the cache miss detected in S62 as a cache hit (S64). Then, the controller 100 updates the storage contents of the predicted cache hit rate management table 1234 (S65).

A method for calculating the maximum prefetch quantity DPmax will be explained based on FIGS. 9 and 10. As already stated, the maximum prefetch quantity DPmax constitutes the basis for calculating the prefetch quantity DP, and the closer the data fragmentation index FI gets to "1", the more closely the prefetch quantity DP approximates the maximum prefetch quantity DPmax.

Figure 9:
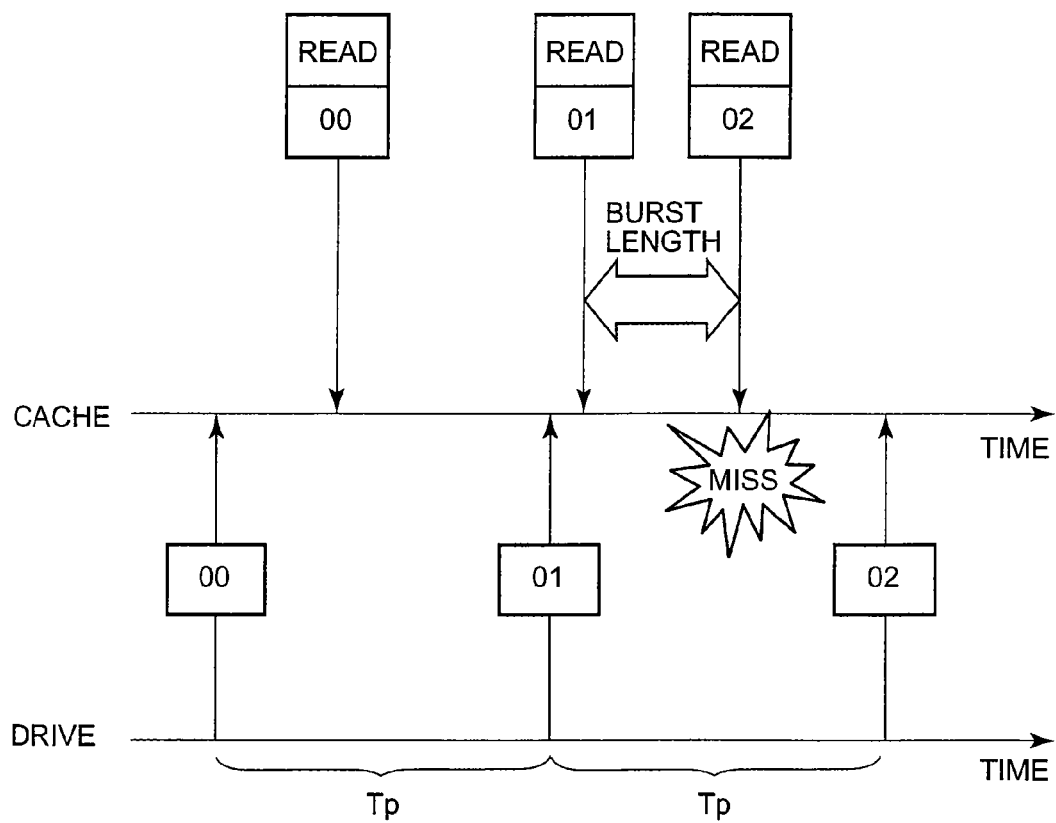
FIG. 9 is a diagram schematically showing the relationship between the timing of a read request (read access) from a host and the timing of a prefetch.

FIG. 9 is a diagram schematically showing the relationship between read access timing from the host 20 and data prefetch timing. The horizontal axes denote the passage of time. The horizontal axis shows the lapse of time. A prefetch for storing data from a logical volume 230 to the cache region 130 in advance is executed at a predetermined operating cycle of 1/Tp.

In other words, a prefetch is performed at each predetermined time Tp. The time Tp stipulating this prefetch interval is the constant. Simply put, for example, an appropriate value of ten or more milliseconds can be selected and used as the Tp. Or, this embodiment can be constituted so as to determine the average read access reception interval from the read access statistical information managed by the monitor module 126, and to use this value as the time Tp. Furthermore, when the average read access reception interval is utilized, it is desirable to set a Tp value, which differs respectively for each logical volume 230. This is because there are situations in which the frequency of read accesses will be different for each logical volume 230.

The example shown in FIG. 9 schematically shows a series of sequential accesses for a single logical volume 230. As shown in FIG. 9, data blocks "00", "01" and "02" are stored in sequential order in the cache region 130 at each predetermined time Tp by operating the prefetch function. The maximum prefetch quantity DPmax worth of data is stored in the cache region 130 at each prefetch. In the example given in FIG. 9, one block of data is stored in the cache region 130 at each time Tp. Therefore, the maximum prefetch quantity DPmax in this case is one block.

Since the storage contents (data) of data block "00" are stored in the cache region 130 prior to a read access from the host 20, a cache hit occurs, and prefetch is successful.

Similarly, since the data of data block "01" is also stored in the cache region 130 prior to a read access from the host 20, a cache hit occurs. Therefore, the prefetch of data block "01" is also successful.

In contrast to this, since prefetch did not occur in time in the case of data block "02", a cache miss occurs. Since the interval of read accesses from the host 20 is not always fixed, fluctuations occur, and this can result in the prefetch timing being slower than the read access timing. This kind of variation in the read access interval is generated by the operating state of the host 20 file system. For example, when the file system carries out an independent prefetch separate from the prefetch inside the storage system 10, read requests are issued at a relatively short cycle. Further, the timing at which the host 20 accesses the storage system 10 will differ in accordance with the speed (bit rate) at which data is delivered from the host 20 to a user machine 40.

In this embodiment, as explained hereinabove, the cache hit rate CH is used to calculate the data fragmentation index FI. Therefore, it is not desirable for the cache hit rate to decrease as the result of a factor other than data fragmentation. Accordingly, in this embodiment, a sufficient prefetch quantity DP is secured so that prefetch timing will match up with read access timing.

That is, this embodiment uses the maximum data quantity (burst length) to be accessed by the host 20 within the prefetch interval Tp as the maximum prefetch quantity DPmax, which constitutes the basis for calculating a prefetch quantity DP. This makes it possible to prefetch the maximum quantity DPmax of data capable of being requested by the host 20 within the time Tp, enabling the decrease in the cache hit rate to be held in check.

Figure 10:
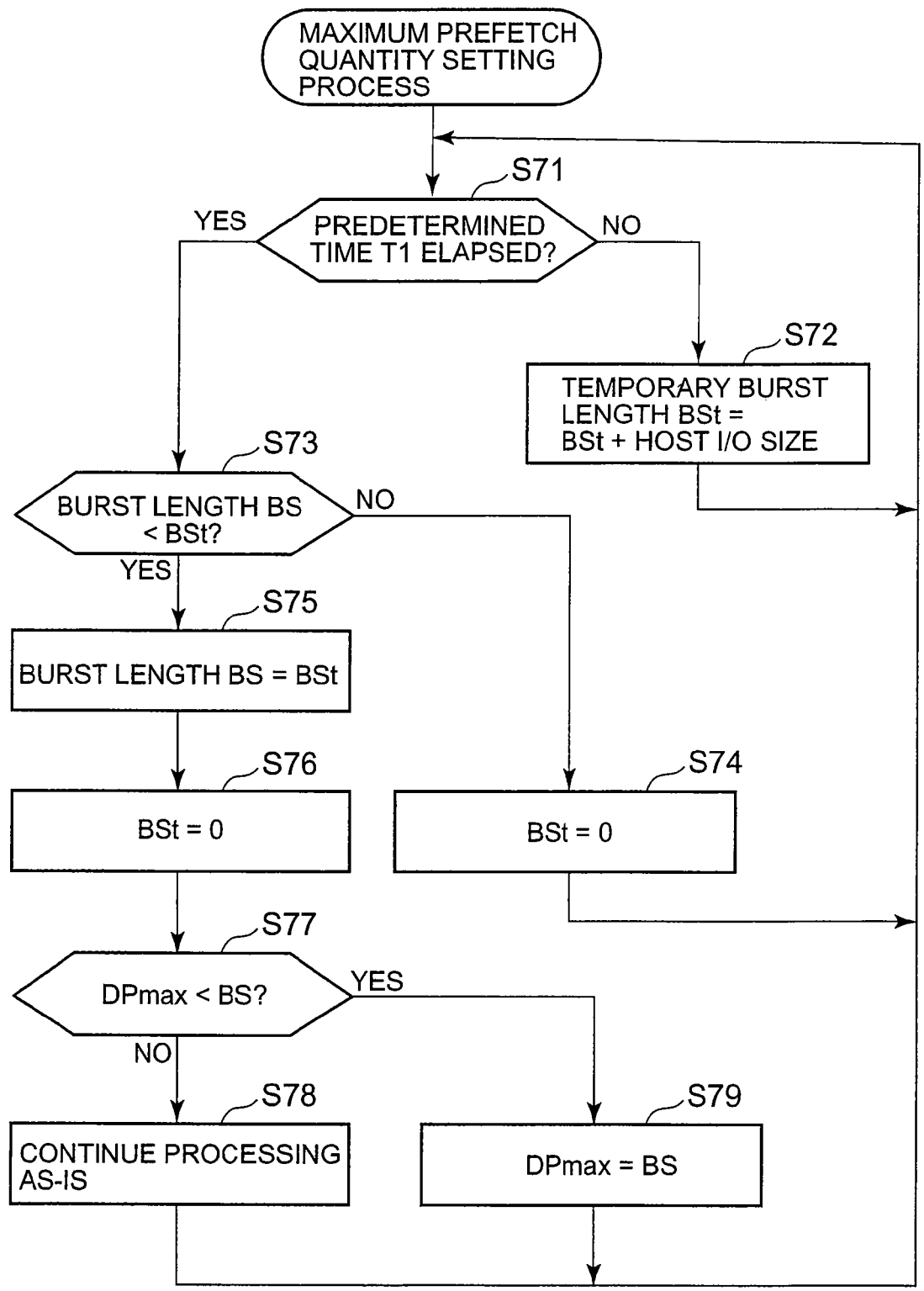
FIG. 10 is a flowchart showing the processing for calculating a maximum prefetch quantity.

FIG. 10 is a flowchart showing the process for setting a maximum prefetch quantity. This process is achieved based on the prefetch quantity calculation module 124. In this process, the maximum prefetch quantity DPmax is controlled in accordance with the burst length BS.

As explained hereinabove, here each burst length BS will differ, for example, depending on the prefetch operation at the file system level of the host 20, and the stream bit rate for delivering data to the respective user machines 40. Ordinarily, since one file system corresponds to one logical volume 230, there is a high likelihood that the burst length BS will differ for each logical volume 230. Accordingly, in this embodiment, a burst length BS is calculated for each logical volume 230. Therefore, in this embodiment, an appropriate prefetch quantity DP corresponding to the extent of data fragmentation is respectively set for each logical volume 230, and response performance of greater than the minimum guaranteed drive performance is assured.

The controller 100, upon detecting a read access from the host 20, determines whether or not T1 time has elapsed since the point in time at which the previous burst length was confirmed (S71). Time T1 is the burst length confirmation cycle, and is arbitrarily set at an appropriate value.

When a predetermined time T1 has not elapsed since the previous burst length confirmation time (S71: NO), the controller 100 adds the data length (host I/O size) requested in the current read access to a temporary burst length BSt (S72), and returns to S71. That is, the controller 100 repeats the operation BSt=BSt+host I/O size until the predetermined time T1 has elapsed, and measures the burst length.

Here, both the temporary burst length BSt and burst length BS initial value are zero (0). Further, the time at which a read access was issued from the host 20, and the size of the data for which a readout was requested can be acquired from the monitor module 126.

When a predetermined time T1 has elapsed since the previous burst length confirmation time (S71: YES), the controller 100 determines whether or not the temporary burst length BSt is larger than the burst length BS detected previously (that is, the burst length currently in use) (S73).

When the current burst length BS is larger than the temporary burst length BSt (S73: NO), the controller 100 continues to use the current burst length BS as-is. The controller 100 resets the temporary burst length BSt (S74), and returns to S71. Then, the controller 100 determines the latest temporary burst length BSt by once again adding up the size of the data, which was read accessed by the host 20 during the predetermined time T1.

When the temporary burst length BSt is larger than the current burst length BS (S73: YES), the controller 100 employs the value of the temporary burst length BSt as the new burst length BS (S75). Then, the controller 100 compares the updated burst length BS against the maximum prefetch quantity DPmax (S77).

When the maximum prefetch quantity DPmax is greater than the burst length BS (S77: NO), the controller 100 continues the prefetch process using the current setting as-is without updating the maximum prefetch quantity DPmax (S78).

By contrast, when the burst length BS is larger than the maximum prefetch quantity DPmax (S77: YES), as explained hereinabove, since it is possible that the prefetch will fail, the controller 100 sets the value of the maximum prefetch quantity DPmax as the value of the burst length BS (S79). It is possible to reduce prefetch failure by updating the maximum prefetch quantity DPmax in accordance with the latest burst length BS. It is then possible to curb cache misses resulting from prefetch failure, and to suppress the decrease in reliability of the data fragmentation index FI.

Furthermore, this embodiment can be constituted to calculate the maximum prefetch quantity DPmax using another method that differs from the above-mentioned method. For example, when the number of streams to be used in streaming delivery is determined beforehand, the maximum prefetch quantity DPmax can also be determined by dividing the size of the cache region 130 by the number of streams (DPmax=cache region size/number of streams).

Figure 11:
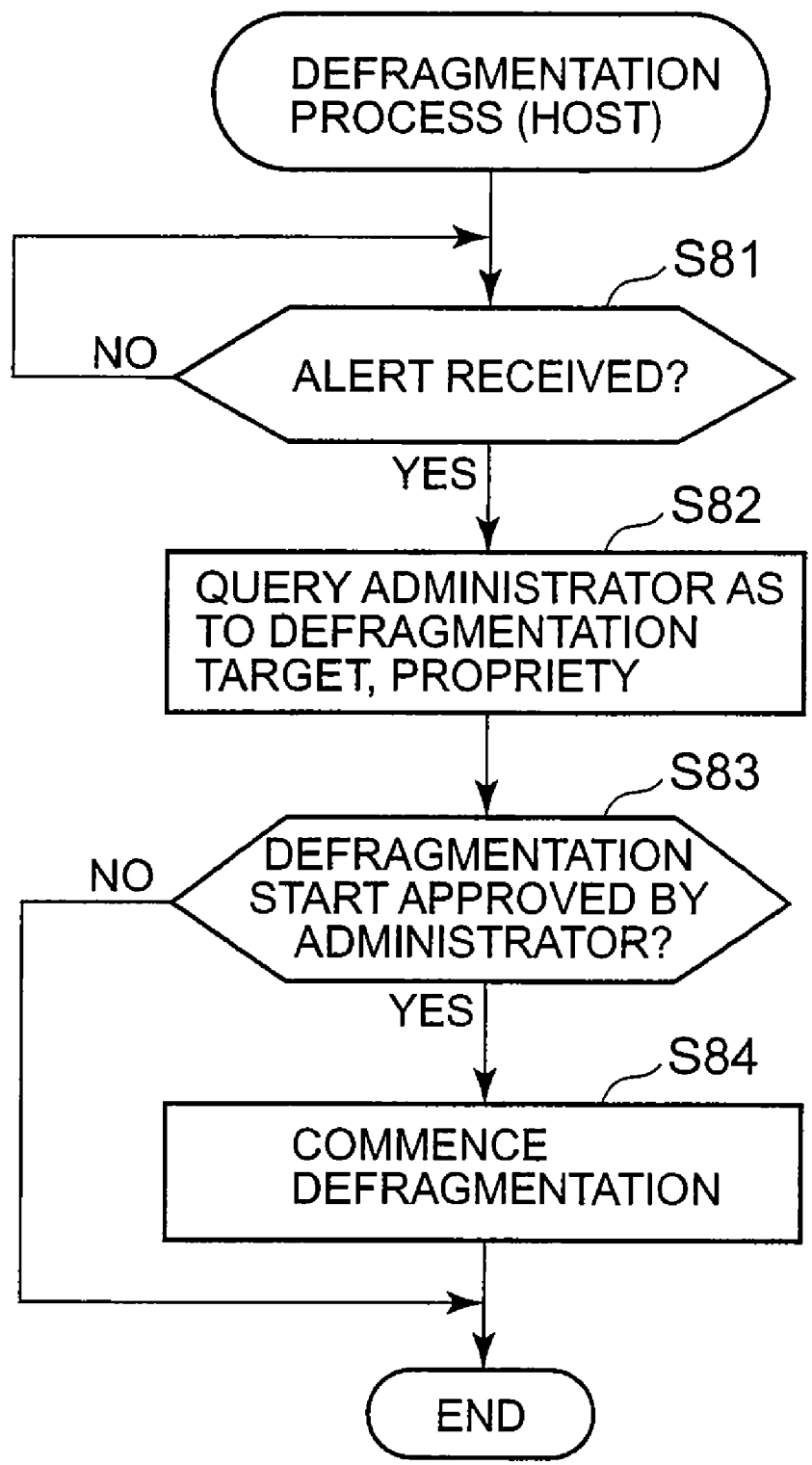
FIG. 11 is a flowchart showing processing for using an alert as an opportunity to rearrange data.

FIG. 11 is a flowchart showing a defragmentation process, which is started up inside the host 20 by halting the prefetch function. As explained together with FIG. 5, when the data arrangement inside a logical volume 230 is fragmented, and the continuity of the data arrangement is lost, the controller 100 automatically halts the prefetch function (s36), and outputs an alert (S37).

When the host 20 receives an alert from the controller 100 (S81: YES), it specifies the logical volume 230 targeted for defragmentation, and queries the host 20 administrator as to the propriety of executing defragmentation (S82).

The host 20 administrator, using the host 20 user interface, can check the logical volume 230 in which data fragmentation is occurring, and make a determination as to whether or not to execute defragmentation.

When the host 20 administrator instructs the execution of defragmentation via the host 20 user interface (S83: YES), the host 20 executes defragmentation for the logical volume 230 targeted for defragmentation (S84).

Furthermore, for example, this embodiment can be constituted such that a confirmation mode, which requires an administrator's approval, and an automatic mode, which does not require approval, can be provided in advance, and when the automatic mode is set, defragmentation can commence without waiting for approval from the administrator.

Further, when the controller 100, for example, comprises a file system such as a NAS (Network Attached Storage), the controller 100 can also carry out data rearrangement processing.

In addition, by linking the streaming delivery process and the defragmentation process, which are run on the host 20, it is also possible to carry out defragmentation processing for only specific file data, such as a file currently being accessed.

Since this embodiment is constituted as described hereinabove, it provides the following effect. In this embodiment, the constitution is such that a determination is made as to whether or not prefetch can be expected to be effective during the period that streaming delivery is being performed, and the prefetch function is only set to ON when prefetch can be expected to be effective, and a prefetch quantity DP is appropriately controlled in accordance with the extent of data fragmentation (FI). Therefore, even when a data arrangement is fragmented, it is possible to enhance reliability by preventing the response performance of the storage system 10 from falling below the response performance provided by the disk drive 210.

Figure 12A:
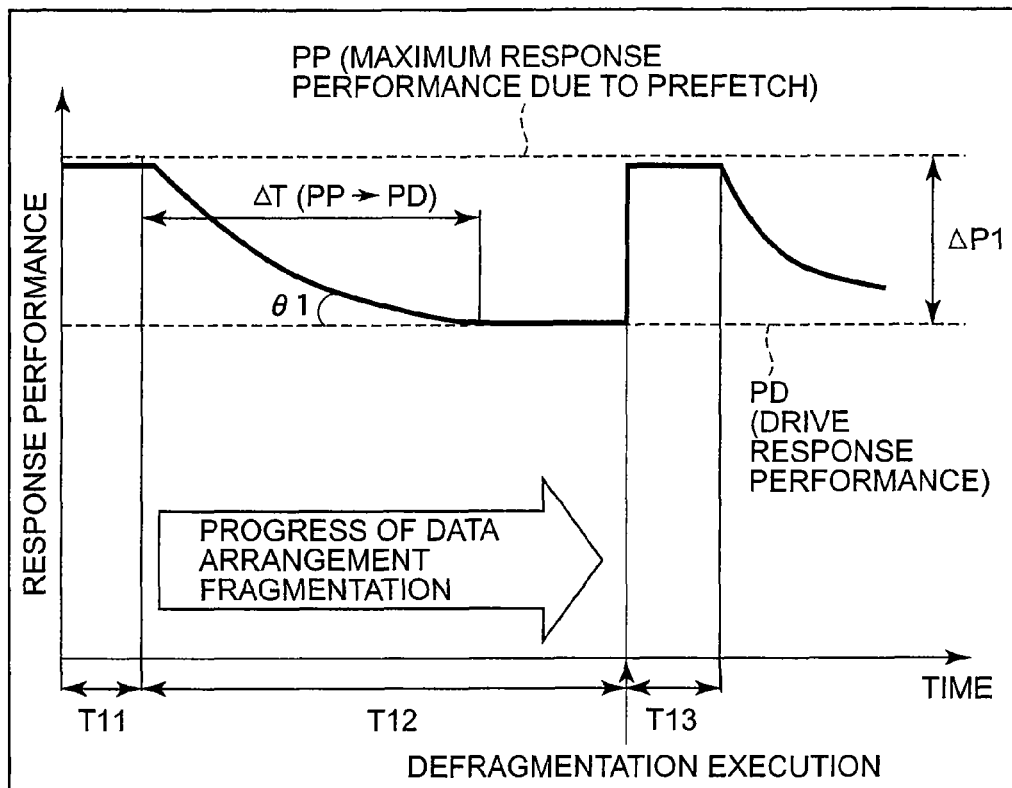
FIG. 12 is a characteristics diagram showing, respectively, (a) storage system response performance when prefetch operational control is performed using an embodiment of the present invention, and (b) storage system response performance when prefetch operational control is not performed using an embodiment of the present invention.
Figure 12B:
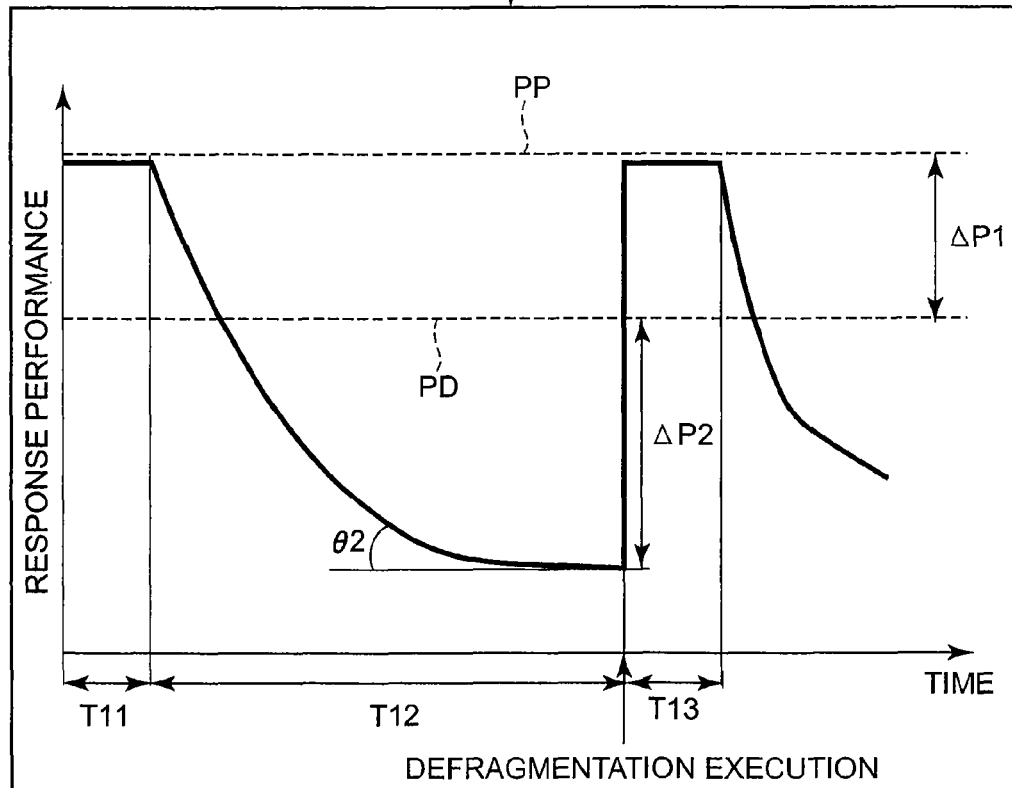

This point will be explained by referring to FIG. 12. FIG. 12(a) shows the response performance of the storage system 10 when control of the prefetch function is performed by this embodiment. FIG. 12(b) shows the response performance of the storage system 10 when control of the prefetch function is not performed by this embodiment. The horizontal axes of the respective characteristics diagrams of FIG. 12 are the time axes, and the vertical axes show the response performance of the storage system 10.

As already explained, when data is prefetched ahead of a read access from the host 20, and the prefetch is successful, the response performance of the storage system 10 can be improved. By contrast, when prefetched data results in a cache miss, that is, when a prefetch fails, the response performance of the storage system 10 drops below the response performance of the disk drive 210.

The PP in FIG. 12 indicates the response performance when a prefetch succeeds. The response performance PP when a prefetch succeeds is the maximum response performance of the storage system 10. The PD in FIG. 12 indicates the response performance of a disk drive 210. That is, PD is the response performance at the time data is read out from a disk drive 210 when a read access is issued by the host 20. The response performance when a prefetch succeeds PP is greater that the response performance of a disk drive 210 PD (PP>PD).

As shown in FIG. 12(a), data is sequentially arranged during the period T11. In this case, because the probability of prefetch succeeding is high, the response performance of the storage system 10 approaches PP. Therefore, the storage system 10 exhibits a response performance that is higher than the response performance PD of the disk drive 210 by $\Delta P1$ ($\Delta P1=PP-PD$).

However, the content data stored in a logical volume 230, that is, the data arrangement of the content data stored in a disk drive 210 gradually loses its continuity due to editing and the like being carried out as needed. For example, a host 20 administrator will replace advertisement information embedded in the content data, delete certain data and add new data.

Data arrangement fragmentation progresses in period T12 as a result of this kind of editing work being performed. When a certain time $\Delta T$ has elapsed, the response performance of the storage system 10 drops from the maximum value of PP to PD. However, in this embodiment, when the extent of data arrangement fragmentation is detected based on the cache hit rate, and it is determined that the prefetch function is not working effectively, the prefetch function is automatically halted. Therefore, the response performance of the storage system 10 does not fall below the disk drive 210 response performance PD. That is, the storage system 10 of this embodiment assures the disk drive 210 response performance PD as the minimum guaranteed response performance of the storage system. Therefore, a host 20 (administrator) using this storage system 10 can normally expect response performance from the storage system 10 that is greater than the response performance PD of the disk drive 210.

Further, in this embodiment, the prefetch quantity DP is properly controlled in accordance with the extent of data arrangement fragmentation (FI). That is, by making the prefetch quantity DP smaller the more data arrangement fragmentation progresses, the likelihood of a cache miss occurring is reduced. Therefore, in time period T12, during which data arrangement fragmentation is progressing, the angle θ1 at which the response performance of the storage system 10 decreases from the maximum value PP to the minimum guaranteed value PD, can be made relatively smaller. This enables the time $\Delta T$ during which the response performance of the storage system 10 drops from PP to PD to be made relatively longer. As a result, it is possible to increase the average response performance of the storage system 10, enhancing reliability and usability.

Then, when the prefetch function is changed to the OFF state, an alert is outputted from the controller 100 to the host 20. When data rearrangement processing (defragmentation processing) is carried out in line with this alert, the continuity of the data arrangement is restored (T13).

The preceding is the response performance of the storage system 10 in accordance with this embodiment. By contrast, as shown in FIG. 12(*b*), when the prefetch function is not controlled, storage system response performance decreases from the maximum value PP as data arrangement fragmentation progresses, finally falling below the response performance of the disk drive PD.

Moreover, since prefetch continues with the prefetch quantity fixed as-is, the prefetch failure rate increases the more data arrangement fragmentation progresses. Therefore, storage system response performance sharply decreases at a relatively large angle ($\theta 2 > \theta 1$).

Thus, since proper prefetch control is carried out in this embodiment, it is possible to prevent the response performance of the storage system 10 from falling below the response performance PD of the disk drive 210, enabling enhanced reliability.

In this embodiment, the degree of fragmentation of the data arrangement is indirectly inferred on the basis of the cache hit rate. Therefore, the extent of data arrangement fragmentation can be measured indirectly without examining the actual data arrangement inside a logical volume 230, and prefetch control can be carried out without placing a big load on the storage system 10.

In this embodiment, when the prefetch function is changed from the ON state to the OFF state, an alert is outputted. Therefore, the administrator of a host 20 can confirm whether or not there is fragmentation based on this alert. Further, data rearrangement processing can also be started up automatically in accordance with this alert. Therefore, usability is enhanced.

Second Embodiment

A second embodiment will be explained on the basis of FIGS. 13 and 14. The following embodiments, to include this embodiment, correspond to variations of the first embodiment. In this embodiment, only the ON/OFF of the prefetch function is controlled without adjusting the value of the prefetch quantity DP.

Figure 13:
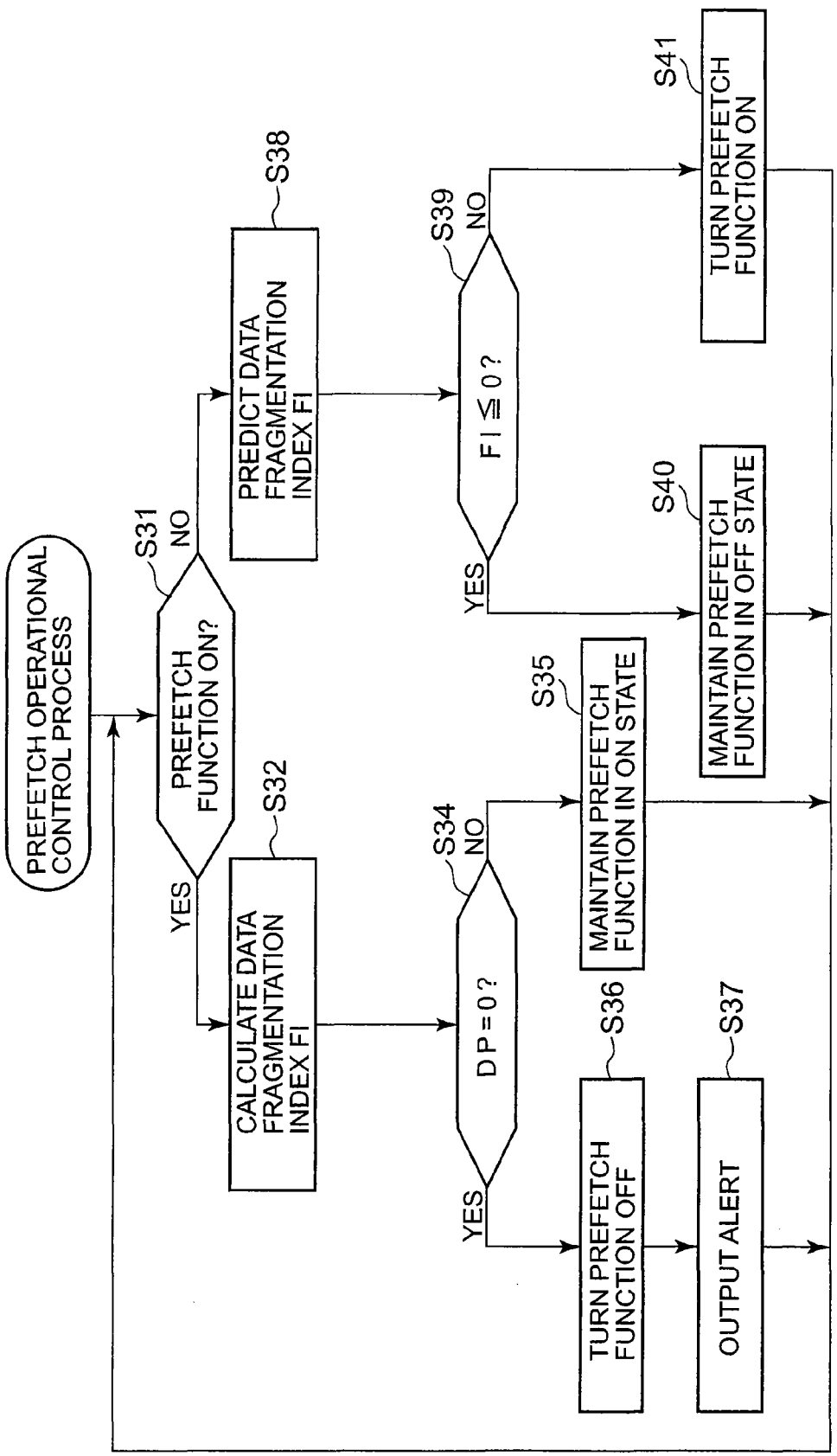
FIG. 13 is a flowchart showing prefetch operational control processing executed by a storage system related to a second embodiment.

FIG. 13 is a flowchart showing a prefetch operational control process according to this embodiment. With the exception of S33, this flowchart comprises all the steps from S31 through S41 included in the flowchart shown in FIG. 5.

That is, in the prefetch operational control process of this embodiment, the prefetch quantity DP is not updated based on a data fragmentation index FI. The prefetch quantity DP is fixed as-is, and only the ON/OFF of the prefetch function is controlled.

Figure 14:
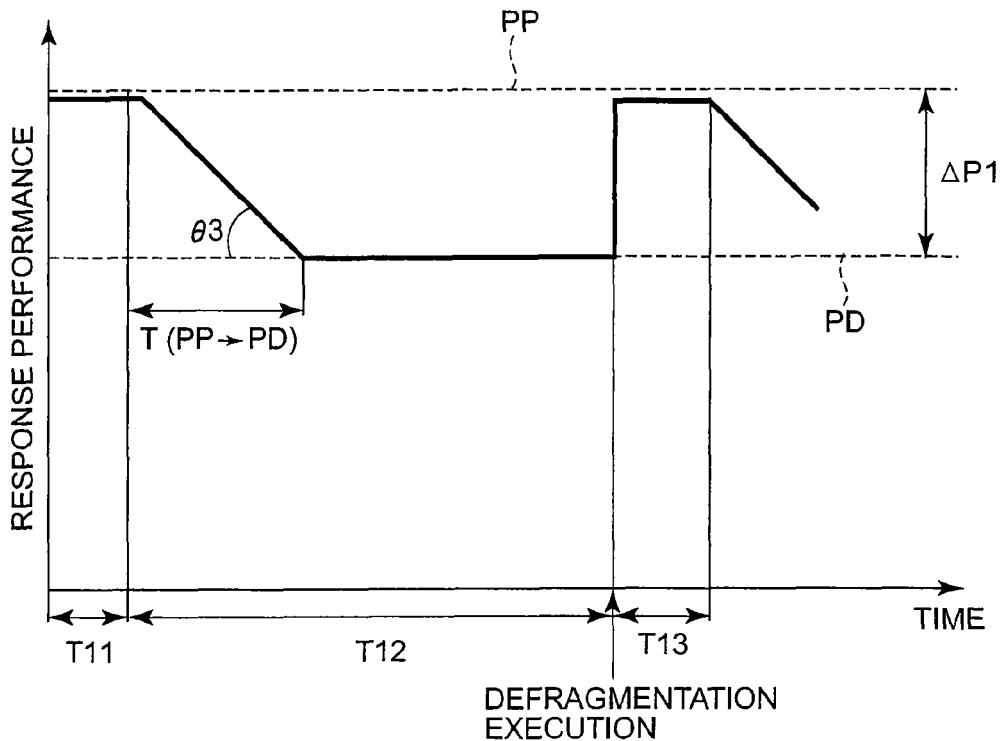
FIG. 14 is a characteristics diagram showing storage system response performance.

FIG. 14 shows the response performance characteristics of the storage system 10 in accordance with this embodiment. As can be seen by comparing FIG. 14 with FIG. 12 (*a*), since the prefetch quantity DP is not adjusted in this embodiment, the angle $\theta 3$ at which the response performance of the storage system 10 decreases from the maximum value PP to the minimum guaranteed value PD is larger than the angle $\theta 1$ in FIG. 12 (*a*) ($\theta 3 > \theta 1$). That is, the response performance of the storage system 10 of this embodiment can drop sharply to PD as data arrangement fragmentation progresses. However, the response performance of the storage system 10 does not fall below PD, which is the minimum guaranteed value.

This embodiment, which is constituted in this manner, exhibits the same effect as the first embodiment, with the exception of the effect related to updating the prefetch quantity. In addition to this, since the prefetch quantity is fixed in this embodiment, control content can be simplified more than in the first embodiment.

Third Embodiment

A third embodiment will be explained based on FIG. 15. In this embodiment, prefetch operational control does not commence until the statistical information required for carrying out the prefetch operational control described in the first embodiment has been stored.

Figure 15:
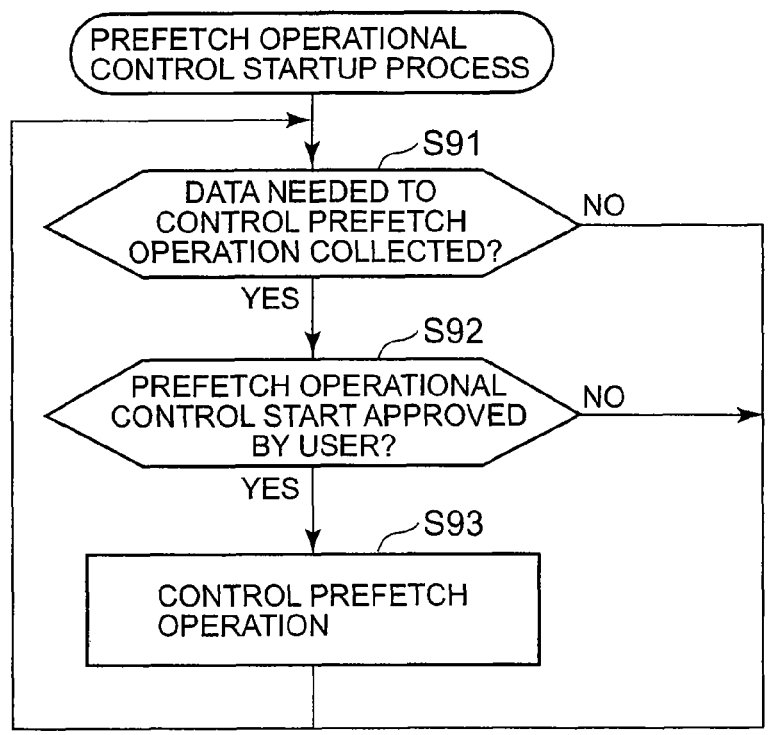
FIG. 15 is a flowchart showing processing for booting up prefetch operational control executed by a storage system related to a third embodiment.

FIG. 15 is a flowchart showing the process for starting up prefetch operational control. The controller 100 uses the monitor module 126 to make a determination as to whether or not the statistical information needed to carry out the control of a prefetch operation (prefetch quantity setting, prefetch function ON/OFF) has been collected (S91). As examples of statistical information, the cache hit rate, read access time, and size of the data being read accessed can be cited.

When sufficient statistical information has been stored to commence prefetch operational control (S91: YES), the controller 100 determines whether or not user (host administrator) approval has been obtained for commencing prefetch operational control (S92).

When approval has been obtained either before or after the fact (S92: YES), the controller 100 commences the above-mentioned prefetch operational control.

This embodiment, which is constituted in this manner, exhibits the same effect as the first embodiment described hereinabove. In addition to this, since a prefetch operation is not controlled until the statistical information required for prefetch operational control is stored, a prefetch operation can be controlled with higher precision, and storage system 10 reliability can be enhanced.

Furthermore, the present invention is not limited to the above-described embodiments. It is possible for a person skilled in the art to make various additions and changes without departing from the scope of the invention.

What is claimed is:

1. A storage system comprising:
   a storage apparatus comprising at least one or more rewritable storage devices for storing data expected to be read out sequentially;
   a cache memory for storing the data to be read out from the storage apparatus;
   a prefetch section for reading out, in advance, the data stored in the storage apparatus and storing the data in the cache memory before a sequential read access is received from a host;
   a continuity determination section for determining a continuity measure indicative of the continuity of the arrangement of the data stored in the storage apparatus which is calculated from a cache hit rate of read accesses issued from the host when the prefetch section is ON, wherein the cache hit rate was determined with the assumption that the prefetch section was ON when in fact the prefetch section was OFF;
   a prefetch quantity calculator for calculating a prefetch quantity on the basis of the continuity measure and the state of a read access from the host; and
   a prefetch operation controller for setting the prefetch quantity calculated by the prefetch quantity calculator in the prefetch section, and controlling the operation of the prefetch section based on the continuity measure, wherein when the prefetch section is ON then the continuity measure is computed as $$FI = Ch - b/1 - b$$

where FI is the continuity measure, Ch is the cache hit rate, and b is a constant (0<b<1).

2. The storage system according to claim 1, wherein the continuity determination section monitors a cache hit rate of the cache memory and produces the continuity measure indicative of the arrangement of the data stored in the storage apparatus based on the cache hit rate.

3. The storage system according to claim 1, wherein when the prefetch section is ON and the prefetch quantity is zero, then the prefetch section turns OFF.

4. The storage system according to claim 3, wherein when the prefetch section turns OFF then an alert is outputted by the prefetch operation controller.

5. The storage system according to claim 4, wherein when the prefetch section turns OFF then the prefetch operation controller performs a defragmentation process.

6. The storage system according to claim 1, wherein when the prefetch section is OFF and the prefetch quantity exceeds zero, then the prefetch section turns ON.

7. The storage system according to claim 1, wherein the prefetch section is OFF and a cache access is detected as a cache miss then if it is determined that the cache access would have been detected as a cache hit had the prefetch section been turned ON, then the cache access is counted as a cache hit.

8. The storage system according to claim 1, wherein when the prefetch section is OFF then the continuity measure is computed as $$FI = Che - b/1 - b$$

where FI is the continuity measure, Che is a predicted cache hit rate, and b is a constant (0<b<1).

9. A storage system control method comprising:
storing data on a storage apparatus;
selectively enabling and disabling prefetch operations, wherein a prefetch operation includes reading out, in advance, the data stored in the storage apparatus and storing the data in a cache memory before a sequential read access is received from a host;
determining a continuity measure indicative of the continuity of the arrangement of the data stored in the storage apparatus which is calculated from a cache hit rate of read accesses issued from the host when prefetch operations are enabled, wherein the cache hit rate was determined with the assumption that prefetch operations were enabled when in fact the prefetch operations was disabled;
calculating a prefetch quantity on the basis of the continuity measure and the state of a read access from the host; and
when prefetch operations are enabled, each prefetch operation is performed in accordance with the prefetch quantity and the continuity measure, further comprising computing the continuity measure as $$FI = Che - b/1 - b$$

where FI is the continuity measure, Che is a predicted cache hit rate, and b is a constant (0<b<1) when the prefetch operations are disabled.

10. The method according to claim 9, further comprising monitoring a cache hit rate of the cache memory and producing the continuity measure indicative of the arrangement of the data stored in the storage apparatus based on the cache hit rate.

11. The method according to claim 9, wherein when the prefetch operations are enabled and the prefetch quantity is zero, then the prefetch operations are disabled.

12. The method according to claim 11, further comprising outputting an alert when the prefetch operations are disabled.

13. The method according to claim 12, further comprising performing defragmentation when the prefetch operations are disabled.

14. The method according to claim 9, wherein when the prefetch operations are disabled and the prefetch quantity exceeds zero, then the prefetch operations are enabled.

15. The method according to claim 9, wherein when the prefetch operations are disabled and a cache access is detected as a cache miss then if it is determined that the cache access would have been detected as a cache hit had the prefetch operations been enabled, then counting the cache access as a cache hit.

16. The method according to claim 9 further computing the continuity measure as $$FI = Ch - b/1 - b$$

where FI is the continuity measure, Ch is the cache hit rate, and b is a constant (0<b<1), when the prefetch operations are enabled.

* * * * *